United States Patent
Laroche et al.

(10) Patent No.: US 10,674,155 B2
(45) Date of Patent: Jun. 2, 2020

(54) METHOD AND APPARATUS FOR SYNTAX ELEMENT ENCODING IN VIDEO CODING AND DECODING

(71) Applicant: CANON KABUSHIKI KAISHA, Tokyo (JP)

(72) Inventors: Guillaume Laroche, Melesse (FR); Christophe Gisquet, Rennes (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 170 days.

(21) Appl. No.: 15/102,496

(22) PCT Filed: Dec. 10, 2014

(86) PCT No.: PCT/EP2014/077295
§ 371 (c)(1),
(2) Date: Jun. 7, 2016

(87) PCT Pub. No.: WO2015/086716
PCT Pub. Date: Jun. 18, 2015

(65) Prior Publication Data
US 2016/0330452 A1    Nov. 10, 2016

(30) Foreign Application Priority Data

Dec. 10, 2013 (GB) .................................. 1321851.6
Dec. 18, 2013 (GB) .................................. 1322471.2

(51) Int. Cl.
*H04N 19/13* (2014.01)
*H04N 19/93* (2014.01)
(Continued)

(52) U.S. Cl.
CPC ........... *H04N 19/13* (2014.11); *H04N 19/157* (2014.11); *H04N 19/184* (2014.11);
(Continued)

(58) Field of Classification Search
None
See application file for complete search history.

(56) References Cited

U.S. PATENT DOCUMENTS

| 7,016,547 B1 | 3/2006 | Smirnov |
| 7,340,103 B2 | 3/2008 | Smirnov |

(Continued)

FOREIGN PATENT DOCUMENTS

| CN | 101065779 A | 10/2007 |
| CN | 101124561 A | 2/2008 |

(Continued)

OTHER PUBLICATIONS

Marcelo J Weinberger et al., "The LOCO-I Lossless Image Compression Algorithm: Principles and Standardization into JPEG-LS", IEEE Transactions on Image Procesing, IEEE Service Center, Piscataway, NJ, US, vol. 9, No. 8, Aug. 1, 2000, XP011025643, ISSN: 1057-7149, DOI: 10.1109/83.855427.*

(Continued)

*Primary Examiner* — Stuart D Bennett
(74) *Attorney, Agent, or Firm* — Canon U.S.A., Inc. IP Division

(57) ABSTRACT

A method of operating an encoder/decoder, and a device, for encoding/decoding a digital image into/from a video bitstream, said methods/device being arranged to: determine a parameter of an entropy code associated to one or more indexes of a block for encoding a coding unit of said digital image according to a palette, said palette comprising a set of indexes associated to pixel values, said entropy code being used for the encoding of at least part of said block, wherein an index of said block is encoded using a flag to indicate one of a plurality of modes for determining the value of the index, and the parameter of the entropy code is determined in dependence of which mode was indicated by the flag to determine the value of the index; and encode/decode said (Continued)

Figure 1:
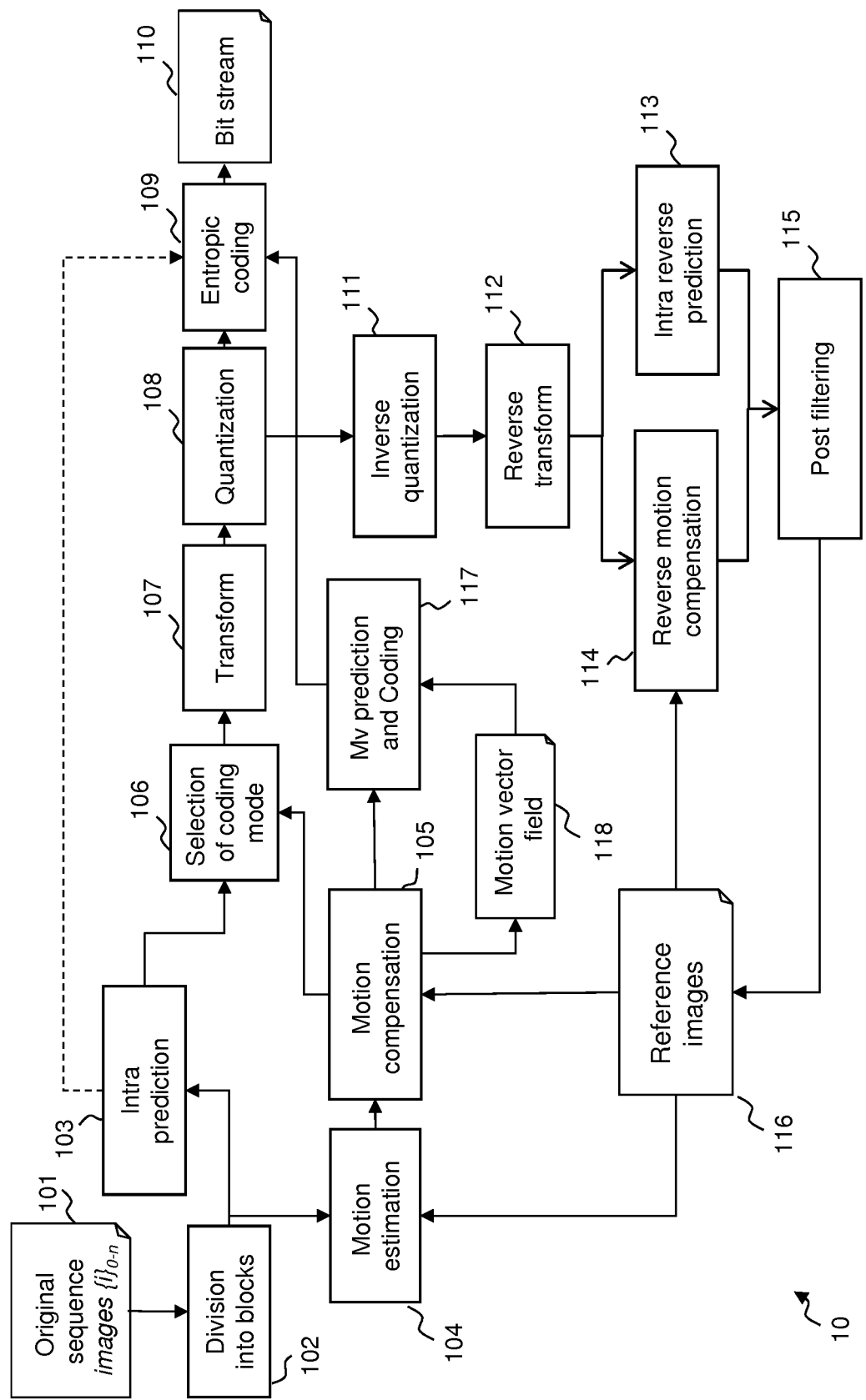

digital image into/from the video bitstream by using the determined parameter to adapt the entropy code.

6 Claims, 17 Drawing Sheets

(51) Int. Cl.
*H04N 19/169* (2014.01)
*H04N 19/157* (2014.01)
*H04N 19/184* (2014.01)
*H04N 19/70* (2014.01)
*H04N 19/593* (2014.01)

(52) U.S. Cl.
CPC ......... *H04N 19/1887* (2014.11); *H04N 19/70* (2014.11); *H04N 19/93* (2014.11); *H04N 19/593* (2014.11)

(56) References Cited

U.S. PATENT DOCUMENTS

2003/0169932 A1 9/2003 Li
2014/0301475 A1* 10/2014 Guo ................. H04N 19/93
375/240.24

FOREIGN PATENT DOCUMENTS

| KR | 10-2012-071253 A | 7/2012 |
|---|---|---|
| RU | 2406222 C1 | 12/2010 |
| WO | WO2004/034323 A2 | 4/2004 |
| WO | 2012/169403 A1 | 12/2012 |
| WO | 2013/109357 A1 | 7/2013 |

OTHER PUBLICATIONS

Guo et al., "Evaluation of Palette Mode Coding on HM-12.0+RExt-4.1", 15. JCT-VG Meeting; Oct. 23, 2013-Nov. 11, 2013; Geneva; (Joint Collaborative Team on Video Coding of ISO/IEC JTC1/SC29/WG11 and ITU-T SG.16), No. JCTVC-O0218-v3, Oct. 23, 2013, XP030115268.*
Guo et al., "Evaluation of Palette Mode Coding on HM-12.0+RExt-4.1", 15. JCT-VG Meeting; Oct. 23, 2013-Nov. 1, 2013; Geneva; (Joint Collaborative Team on Video Coding of ISO/IEC JTC1/SC29/WG11 and ITU-T SG.16), No. JCTVC-O0218-v3, Oct. 23, 2013, XP030115268 (Year: 2013).*
Marcelo J Weinberger et al., "The LOCO-I Lossless Image Compression Algorithm: Principles and Standardization into JPEG-LS", IEEE Transactions on Image Processing, IEEE Service Center, Piscataway, NJ, US, vol. 9, No. 8, Aug. 1, 2000, XP011025643, ISSN: 1057-7149, DOI: 10.1109183.855427.
Guo L et al., "Evaluation of Palette Mode Coding on HM-12.0+RExt-4.1", 15. JCT-VG Meeting; Oct. 23, 2013-Nov. 1, 2013; Geneva; (Joint Collaborative Team on Video Coding of ISO/IEC JTC1/SC29/WG11 and ITU-T SG.16 ), No. JCTVC-O0218-v3, Oct. 23, 2013, XP030115268.
Flynn D et al., "Range Extensions Draft4", 14. JCT-VG Meeting; Jul. 25, 2013-Feb. 8, 2013; Vienna; (Joint Collaborative Team on Video Coding of ISO/IEC JTC1/SC29/WG11 and ITU-T SG.16 ), No. JCTVC-N 1005-v3, Aug. 8, 2013, XP030114950, Section 9, pp. 167-204.
Rosewarne C et al., "HEVC Range Extensions Core Experiment 2 (RCE2): Rice parameter initialisation and update methods", 14. JCT-VG Meeting; Jul. 25, 2013-Feb. 8, 2013; Vienna; (Joint Collaborative Team on Video Coding of ISO/IEC JTC1/SC29/ WG11 and ITU-T SG.16), No. JCTVC-N1122-v5, Sep. 6, 2013, XP030114967.
Laroche G et al., "Non-RCE4: Run coding for Palette mode", 16. JCT-VG Meeting; Sep. 1, 2014-Jan. 17, 2014; San Jose; (Joint Collaborative Team on Video Coding of ISO/IEC JTC1/SC29/WG11 and ITU-T SG.16 ), No. JCTVC-P0113-v5, 1 O Jan. 2014, XP030115609.
Marcelo J. Weinberger et al., "The LOCO-I Lossless Image Compression Algorithm: Principles and Standardization into JPEG-LS", IEEE Transactions on Image Processing, IEEE Service Center, Piscataway, NJ, US, vol. 9, No. 8, Oct. 31, 2000, XP011025643, ISSN: 1057-7149, DOI: 10.1109/83.855427, http://www.labs.hp.com/research/info_theory/loco/.
Flynn D. et al., "High Efficiency Video Coding (HEVC) Range Extensions text specification: Draft 4", Joint Collaborative Team on Video Coding (JCT-VC) of ITU-T SG 16 WP 3 and ISO/IEC JTC 1/SC 29/WG 11, 13th Meeting, JCTVC-N1005, Aug. 18-26, 2013.
Liwei Guo, et al., Evaluation of Palette Mode Coding on HM-12.0+RExt-4.1, Joint Collaborative Team on Video Coding (JCT-VC) of ITU-T SG 16 WP 3 and ISO/IEC JTC 1/SC 29/WG 11, Nov. 2013, p. 1-7.
Marcelo J. Weinberger, The LOCO-I Lossless Image Compression Algorithm: Principles and Standardization into JPEG-LS, IEEE Transactions on Image Processing, vol. 9, No. 8, Aug. 2000, p. 1309-1324.

\* cited by examiner

Fig. 9

Grid 91 (read top-to-bottom, left-to-right in original orientation):

| 0 | 0 | 0 | 0 | 0 | 0 | 0 | 0 |
|---|---|---|---|---|---|---|---|
| 0 | 1 | 0 | 0 | 0 | 0 | 0 | 0 |
| 0 | 1 | 0 | 0 | 0 | 0 | 0 | 0 |
| 0 | 1 | 1 | 1 | 1 | 1 | 1 | 0 |
| 0 | 1 | 2 | 2 | 2 | 2 | 2 | 0 |
| 0 | 1 | 0 | 0 | 0 | 0 | 0 | 0 |
| 0 | 1 | 0 | 0 | 0 | 0 | 0 | 0 |
| 0 | 0 | 0 | 0 | 0 | 0 | 0 | 0 |

92:
Pred mode = 0, Level = 0, Run = 8, Pred mode = 0, Level = 1, Run = 5, Pred mode = 0, Level = 1, Run = 3, Pred mode = 0, Level = 2, Run = 0

93:
Pred mode = 0, Level = 1, Run = 0, Pred mode = 0, Level = 0, Run = 5, Pred mode = 1, Run = 31, Pred mode = 0, Level = 0, Run = 4

METHOD AND APPARATUS FOR SYNTAX ELEMENT ENCODING IN VIDEO CODING AND DECODING

CROSS-REFERENCE TO RELATED APPLICATIONS

The application is the National Phase application of PCT Application No. PCT/EP2014/077295, filed on Dec. 10, 2014 and titled "Method and apparatus for syntax element encoding in video coding and decoding". This application claims the benefit under 35 U.S.C. § 119(a)-(d) of United Kingdom Patent Application No. 1321851.6, filed on Dec. 10, 2013 and titled "Run length parameters coding for palette mode" and United Kingdom Patent Application No. 1322471.2, filed on Dec. 18, 2013 and titled "Method and apparatus for syntax element encoding in video coding and decoding". The above cited patent applications are incorporated herein by reference in their entirety.

The present invention concerns a method and a device for predicting a displacement vector component syntax element encoding in the process of encoding or decoding a video. It particularly concerns the "Run" syntax element in a palette mode encoding in HEVC.

It applies more particularly to a mode of coding where a block of pixel is predictively encoded based on a predictor block encoded with, or built from, a so-called palette.

A palette in this document is defined as a look up table having entries associating an index with a value of a pixel. Typically, but not necessary, the value of a pixel is constituted by the value of each colour component associated to the pixel, resulting in a colour palette. On the other hand, the value of a pixel may be made of a single pixel component, resulting in a monochrome palette.

This mode of encoding a block of pixel is generally referred to as Palette coding mode. It is contemplated to adopt this mode, for example, in the Range Extension of the High Efficiency Video Coding (HEVC: ISO/IEC 23008-2 MPEG-H Part 2/ITU-T H.265) international standard.

When encoding an image in a video sequence, the image is first divided into coding entities of pixels of equal size referred to as Coding Tree Block (CTB). The size of a Coding Tree Block is typically 64 by 64 pixels. Each Coding Tree Block may then be broken down into a hierarchical tree of smaller blocks which size may vary and which are the actual blocks of pixels to encode. These smaller blocks to encode are referred to as Coding Unit (CU).

The encoding of a particular Coding Unit is typically predictive. This means that a predictor block is first determined. Next, the difference between the predictor block and the Coding Unit is calculated. This difference is called the residue. Next, this residue is compressed. The actual encoded information of the Coding Unit is made of some information to indicate the way of determining the predictor block and the compressed residue. Best predictor blocks are blocks as similar as possible to the Coding Unit in order to get a small residue that could be efficiently compressed.

The coding mode is defined based on the method used to determine the predictor block for the predictive encoding method of a Coding Unit.

A first coding mode is referred to as INTRA mode. According to INTRA mode, the predictor block is built based on the value of pixels immediately surrounding the Coding Unit within the current image. It is worth noting that the predictor block is not a block of the current image but a construction. A direction is used to determine which pixels of the border are actually used to build the predictor block and how they are used. The idea behind INTRA mode is that, due to the general coherence of natural images, the pixels immediately surrounding the Coding Unit are likely to be similar to pixels of the current Coding Unit. Therefore, it is possible to get a good prediction of the value of pixels of the Coding Unit using a predictor block based on these surrounding pixels.

A second coding mode is referred to as INTER mode. According to INTER mode, the predictor block is a block of another image. The idea behind the INTER mode is that successive images in a sequence are generally very similar. The main difference comes typically from a motion between these images due to the scrolling of the camera or due to moving objects in the scene. The predictor block is determined by a vector giving its location in a reference image relatively to the location of the Coding Unit within the current image. This vector is referred to as a motion vector. According to this mode, the encoding of such Coding Unit using this mode comprises motion information comprising the motion vector and the compressed residue.

We focus in this document on a third coding mode called Palette mode. According to the Palette mode, it is possible to define a predictor block for a given Coding Unit as a block of indexes from a palette: for each pixel location in the predictor block, the predictor block contains the index associated with the pixel value in the Palette which is the closest to the value of the pixel having the same location (i.e. colocated) in the coding unit. A residue representing the difference between the predictor block and the coding unit is then calculated and encoded. Entry indexes in the Palette are also known as "levels".

When using the Palette mode, the predictor block of levels has to be transmitted in the bitstream. For this transmission, the predictor block is binary encoded using three syntax elements. A first syntax element, called "Pred mode" allows to distinguish between two encoding modes. In a first mode corresponding to a Pred mode having the value 0, the value of the level to be encoded has to be transmitted in the bitstream. In a second mode corresponding to a Pred mode having the value 1, the value of the level to be encoded is obtained from the value of the above pixel in the predictor block. The level does not have to be transmitted.

A second syntax element called "Level" is defined for the transmission of the value of a level in the first mode. The third syntax element, called "Run" is used to encode a repetition value. Considering that the predictor block is scanned from the top left corner to the bottom right corner, row by row from left to right and top to bottom, the Run syntax element gives the number of successive pixels in the predictor block having the same encoding. If the Pred mode is 0, this is the number of successive pixels of the predictor block having the same level value. If the Pred mode is 1, this is the number of successive pixels of the predictor block having a level value corresponding to the level value of the above pixel.

The Run syntax element is encoded using a Golomb-Rice code for the lowest values and an exponential Golomb code for the highest values. These Golomb codes are defined using a parameter called the Golomb order. For the encoding of the Run syntax element, this Golomb order is assumed to have the value 3. It is worth noting that the length of Golomb entropy code depends on the order.

The present invention has been devised to improve the encoding of the encoding of the "Run" syntax element of Palette mode.

It proposes to improve the encoding of the Run syntax element by using a variable Golomb order. Several embodiments are described where the Golomb order is adapted according to different parameters.

According to a first aspect of the present invention there is provided a method for determining at least one parameter of an entropic code associated to indexes of a block of indexes used for encoding a coding unit of an image according to a palette, said palette comprising a set of indexes associated to pixel values, said entropic code being used for the encoding of at least part of said block of indexes, wherein said at least one parameter of an entropic code is determined in dependence of at least a parameter used in the encoding process of said block of indexes.

In an embodiment said at least one parameter of an entropic code is related to the length of the entropic code.

In an embodiment said entropic code is a Golomb type code.

In an embodiment said at least one parameter of an entropic code is the order of the Golomb type code.

In an embodiment at least one index of said block of indexes is predictively encoded, and said at least one parameter of an entropic code is determined in dependence of the prediction mode of said at least one index associated with the entropic code.

In an embodiment, at least one index of said block of indexes is predictively encoded, and said at least one parameter of an entropic code is determined in dependence of the index value of said at least one index associated with the entropic code.

In an embodiment, at least one index of said block of indexes is predictively encoded, and said at least one parameter of an entropic code is determined in dependence of the palette size.

In an embodiment, at least one index of said block of indexes is predictively encoded, and said at least one parameter of an entropic code is determined in dependence of the coding unit size.

In an embodiment, at least one index of said block of indexes is predictively encoded, each index of the block of indexes being associated with a respective pixel and said at least one parameter of an entropic code is determined in dependence of the remaining number of pixels to associate with indexes in the block of indexes.

In an embodiment, at least one index of the block of indexes is encoded by group of successive pixels in scan order, each group being encoded using a first syntax element giving a prediction mode and a second element giving the repetition, and said entropic code is used for the encoding of the repetition syntax element.

In an embodiment the method comprises:
determining categories based on at least one second parameter used in the encoding process of said block of indexes; and
determining a value of said at least one parameter of an entropic code for each category.

In an embodiment the method further comprises:
adapting said determined values of said at least one parameter of an entropic code based on at least one third parameter used in the encoding process of said block of indexes.

In an embodiment said at least one third parameter comprises the last value determined for the same category and the last encoded repetition value.

In an embodiment said at least one second parameter comprises the prediction mode or the index value of the pixel associated with the entropic code.

In an embodiment said least one parameter of an entropic code is determined for the encoding of a given element as the value of the parameter of the entropic code which would have been optimal for the encoding, or decoding, of the last encoded or decoded corresponding element.

In an embodiment the value of said least one parameter of an entropic code is restricted to a fixed number of values.

According to a second aspect of the present invention there is provided a method for encoding video data in a bitstream, wherein said method comprises:
determining at least one parameter of an entropic code according to the method of the first aspect; and
writing a value in said bitstream using the or one determined parameter of an entropic code.

According to a third aspect of the present invention there is provided a method for decoding video data from a bitstream, wherein said method comprises:
obtaining from said bitstream a parameter used in the encoding process of a block of indexes;
determining at least one parameter of an entropic code according to the method of the first aspect.

According to a fourth aspect of the present invention there is provided a device for determining at least one parameter of an entropic code associated to indexes of a block of indexes used for encoding a coding unit of an image according to a palette, said palette comprising a set of indexes associated to pixel values, said entropic code being used for the encoding of at least part of said block of indexes, wherein said device comprises means for determining said at least one parameter of an entropic code in dependence of at least a parameter used in the encoding process of said block of indexes.

According to a fifth aspect of the present invention there is provided a device for encoding video data in a bitstream comprising: means for determining at least one parameter of an entropic code associated to indexes of a block of indexes used for encoding a coding unit of an image according to a palette, said palette comprising a set of indexes associated to pixel values, said entropic code being used for the encoding of at least part of said block of indexes, wherein said device comprises means for determining said at least one parameter of an entropic code in dependence of at least a parameter used in the encoding process of said block of indexes; and means for writing a value in said bitstream using the or one determined parameter of an entropic code.

According to a sixth aspect of the present invention there is provided a device for decoding video data from a bitstream comprising: means for obtaining from said bitstream a parameter used in the encoding process of a block of indexes; and means for determining at least one parameter of an entropic code associated to indexes of a block of indexes used for encoding a coding unit of an image according to a palette, said palette comprising a set of indexes associated to pixel values, said entropic code being used for the encoding of at least part of said block of indexes, wherein said device comprises means for determining said at least one parameter of an entropic code in dependence of at least the parameter used in the encoding process of said block of indexes.

According to a seventh aspect of the present invention there is provided a computer program product for a programmable apparatus, the computer program product comprising a sequence of instructions for implementing a method according to any one of the first, second or third aspects, when loaded into and executed by the programmable apparatus.

According to an eighth aspect of the present invention there is provided a non-transitory computer-readable storage medium storing instructions of a computer program for implementing a method according to any one of the first, second or third aspects.

According to a ninth aspect of the present invention there is provided an information storage means readable by a computer or a microprocessor storing instructions of a computer program, wherein it makes it possible to implement the method according to any one of the first, second or third aspects.

According to one further aspect of the present invention there is provided a method for encoding video data in a bitstream, wherein said method comprises: determining at least one parameter of an entropic code according to the first aspect; and writing in said bitstream, the determined value.

According to another aspect of the present invention there is provided a method for decoding video data from a bitstream, wherein said method comprises: determining at least one parameter of an entropic code according to a first aspect; and reading from said bitstream the determined value According to a further aspect of the invention there is provided a method for determining at least one parameter of an entropic code associated to indexes of a block of indexes used for encoding a coding unit of an image according to a palette, said palette comprising a set of indexes associated to pixel values, said entropic code being used for the encoding of at least part of said block of indexes, wherein said at least one parameter is determined in dependence of at least a parameter used in the encoding process of said block of indexes. Accordingly, the coding of the Run syntax element is improved.

In an embodiment, said at least one parameter of an entropic code is related to the length of the entropic code.

In an embodiment, said entropic code is a Golomb type code.

In an embodiment, said at least one parameter of an entropic code is the order of the Golomb type code.

In an embodiment, at least one index of said block of indexes being predictively encoded, said at least one parameter of an entropic code is determined in dependence of the prediction mode of said at least one index associated with the entropic code.

In an embodiment, at least one index of said block of indexes being predictively encoded, said at least one parameter of an entropic code is determined in dependence of the index value of said at least one index associated with the entropic code.

In an embodiment, at least one index of said block of indexes being predictively encoded, said at least one parameter of an entropic code is determined in dependence of the palette size.

In an embodiment, at least one index of said block of indexes being predictively encoded, said at least one parameter of an entropic code is determined in dependence of the coding unit size.

In an embodiment, at least one index of said block of indexes being predictively encoded, said at least one parameter of an entropic code is determined in dependence of the number of pixels remaining in the block of level to be decoded or encoded.

In an embodiment, said block of indexes being encoded by group of successive pixels in scan order, each group being encoded using a first syntax element giving a prediction mode and a second element giving the repetition, said entropic code is used for the encoding of the repetition syntax element.

In an embodiment, the method comprises:
determining categories based on at least one second parameter used in the encoding process of said block of indexes; and
determining a value of said at least one parameter of an entropic code for each category.

In an embodiment, the method further comprises:
adapting said determined values of said at least one parameter of an entropic code based on at least one third parameter used in the encoding process of said block of indexes.

In an embodiment, said at least one third parameter comprises the last value determined for the same category and the last encoded repetition value.

In an embodiment, said at least one second parameter comprises the prediction mode or the index value of the pixel associated with the entropic code.

In an embodiment, said least one parameter of an entropic code is determined for the encoding of a given element as the value of the parameter of the entropic code which would have been optimal for the encoding, or decoding, of the last encoded or decoded corresponding element.

In an embodiment, the value of said least one parameter of an entropic code is restricted to a fixed number of values.

According to another aspect of the invention there is provided a method for encoding or decoding video data in a bitstream, wherein said method comprises:
a step for determining at least one parameter of an entropic code according to the invention; and
a step of writing in, or reading from, said bitstream, the determined value.

According to another aspect of the invention there is provided a method for encoding a block of indexes used for encoding a coding unit of an image according to a palette, said palette comprising a set of indexes associated to pixel values, said entropic code being used for the encoding of at least part of said block of indexes, said block of indexes being encoded by group of successive pixels in scan order, each group being encoded using a first syntax element giving a prediction mode and a second element giving the repetition, said entropic code is used for the encoding of the repetition syntax element, said palette being reordered according to the occurrence of indexes in the block of indexes, wherein the repetition element is not encoded for groups of pixels associated with an index greater than a predefined threshold.

According to another aspect of the invention there is provided a method for determining at least one parameter of an entropic code associated to indexes of a block of indexes used for encoding a coding unit of an image according to a palette, said palette comprising a set of indexes associated to pixel values, said entropic code being used for the encoding of at least part of said block of indexes, wherein said at least one parameter is determined to be the zero value.

According to another aspect of the invention there is provided a device for determining at least one parameter of an entropic code associated to indexes of a block of indexes used for encoding a coding unit of an image according to a palette, said palette comprising a set of indexes associated to pixel values, said entropic code being used for the encoding of at least part of said block of indexes, wherein said device comprises means for determining said at least one parameter in dependence of at least a parameter used in the encoding process of said block of indexes.

According to another aspect of the invention there is provided a computer program product for a programmable apparatus, the computer program product comprising a sequence of instructions for implementing a method according to the invention, when loaded into and executed by the programmable apparatus.

According to another aspect of the invention there is provided a non-transitory computer-readable storage medium storing instructions of a computer program for implementing a method according to the invention.

According to another aspect of the invention there is provided an information storage means readable by a computer or a microprocessor storing instructions of a computer program, wherein it makes it possible to implement the method according to the invention.

According to yet another aspect of the invention there is provided a method for determining parameters of an entropic code associated with pixels of a block of pixels encoded according to a palette mode in an image, wherein one said parameter is determined in dependence on a prediction direction of the associated pixels.

In an embodiment said determined parameter is a length of the entropic code.

In an embodiment said determined parameter is a parameter of a Golomb code.

In a further aspect of the present invention, there is provided a method of encoding an image, comprising the method for determining parameters of the yet another aspect described above.

In a further aspect of the present invention, there is provided a method of decoding an image, comprising the method for determining parameters of the yet another aspect described above. At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

Figure 2:
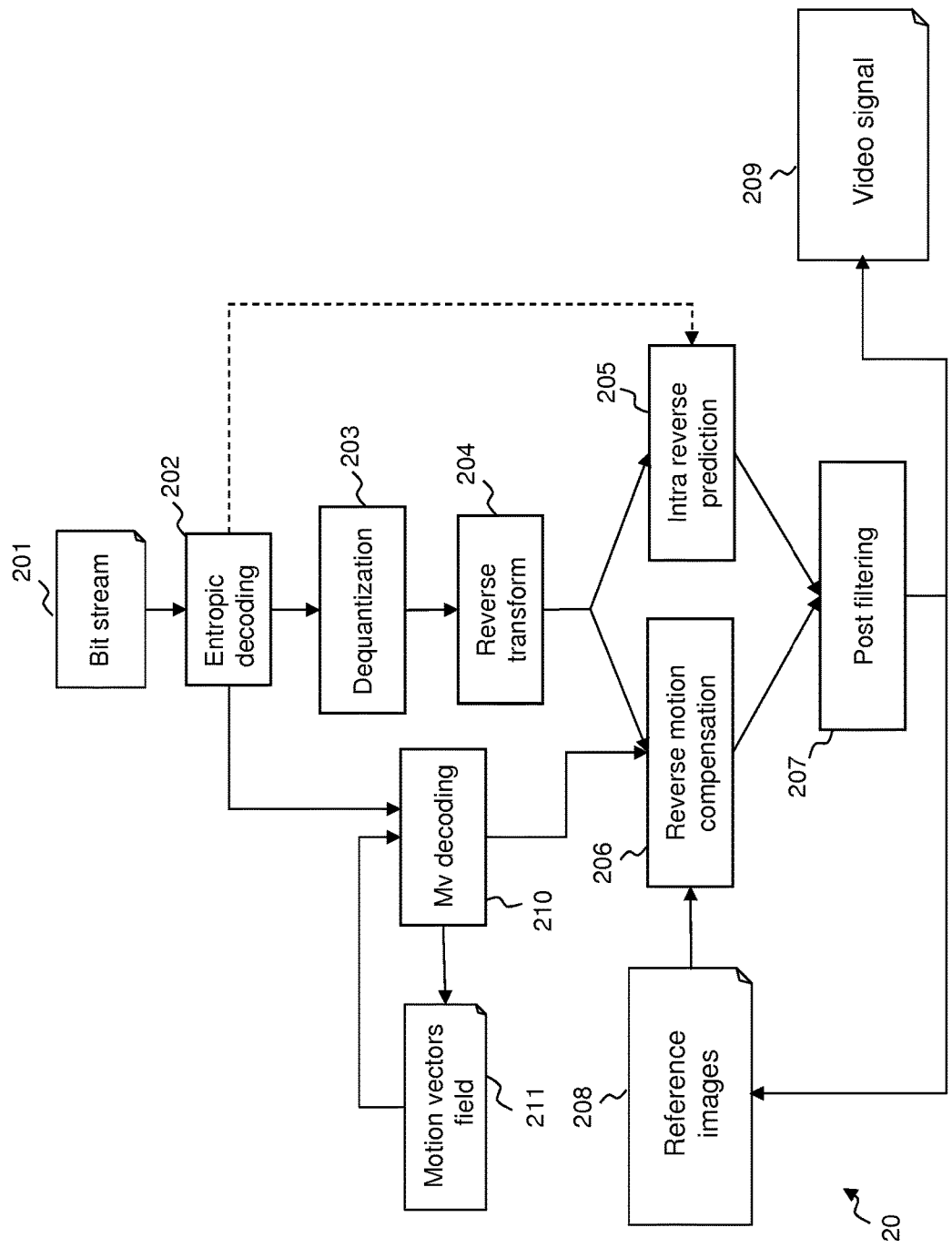
Figure 3:
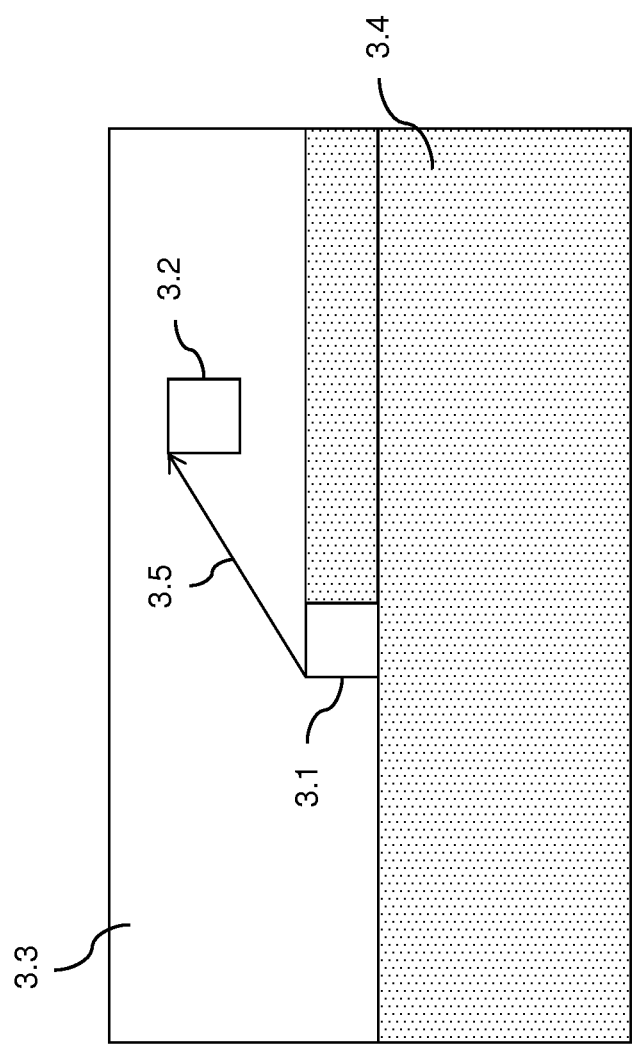
Figure 4:
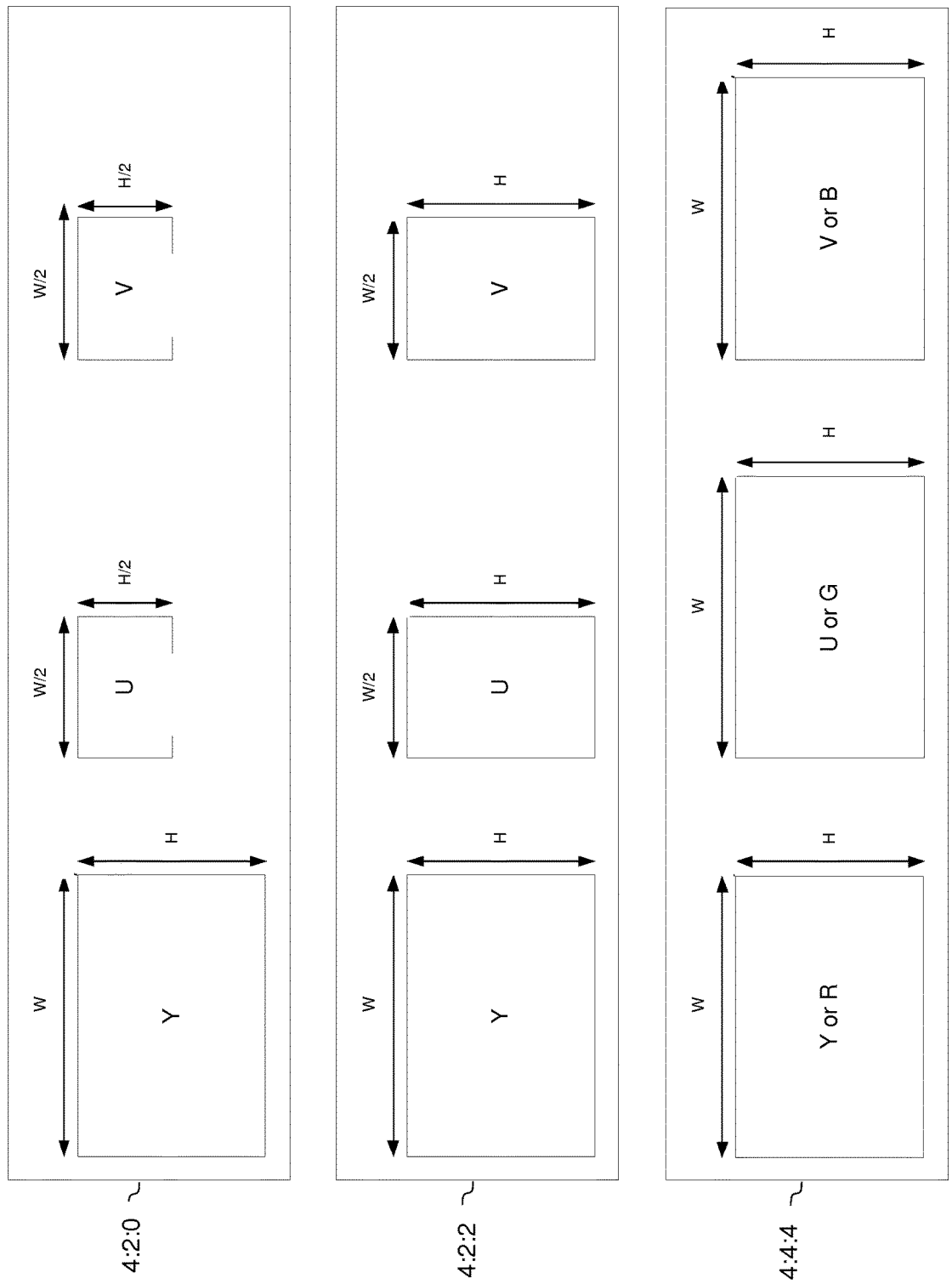
Figure 5:
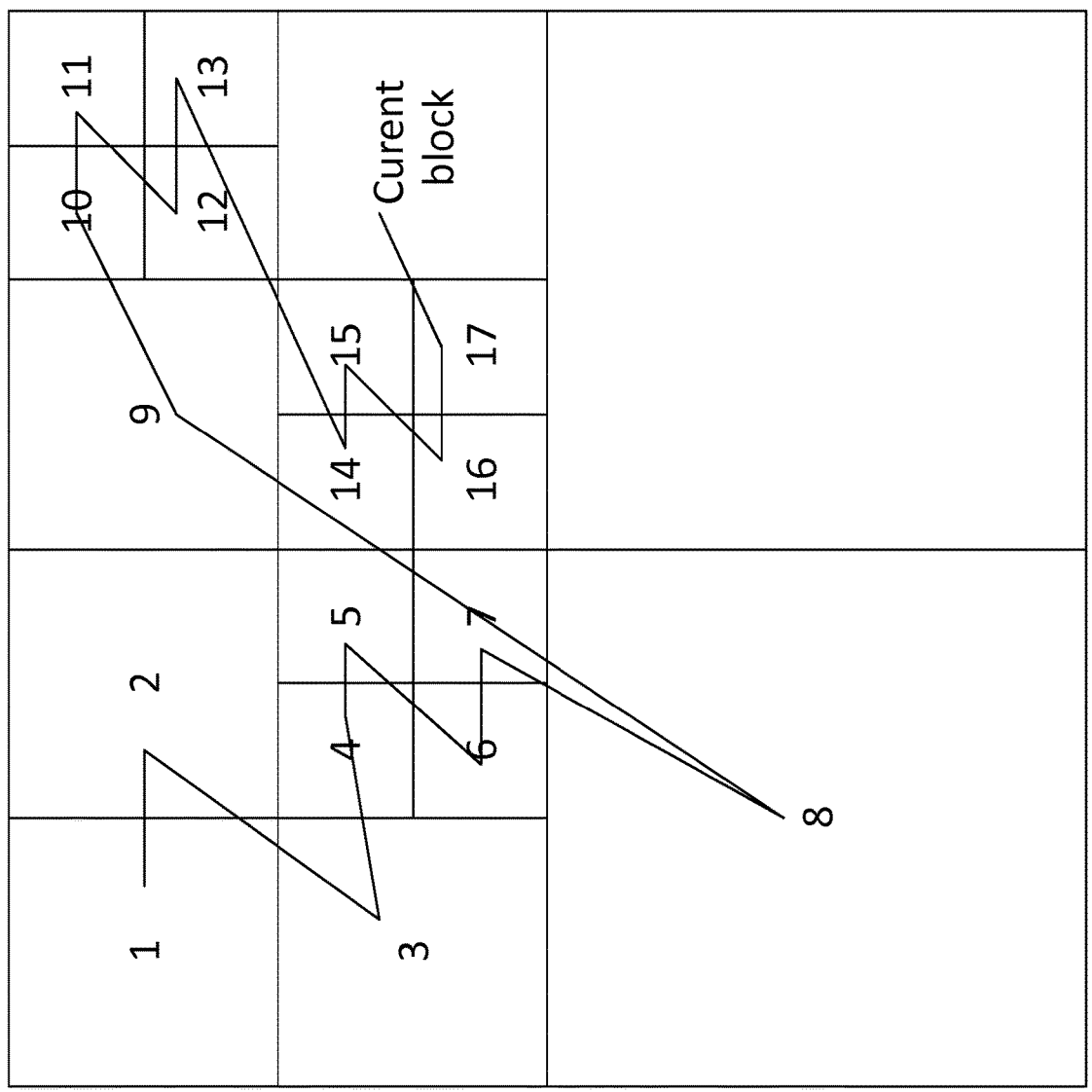
Figure 6:
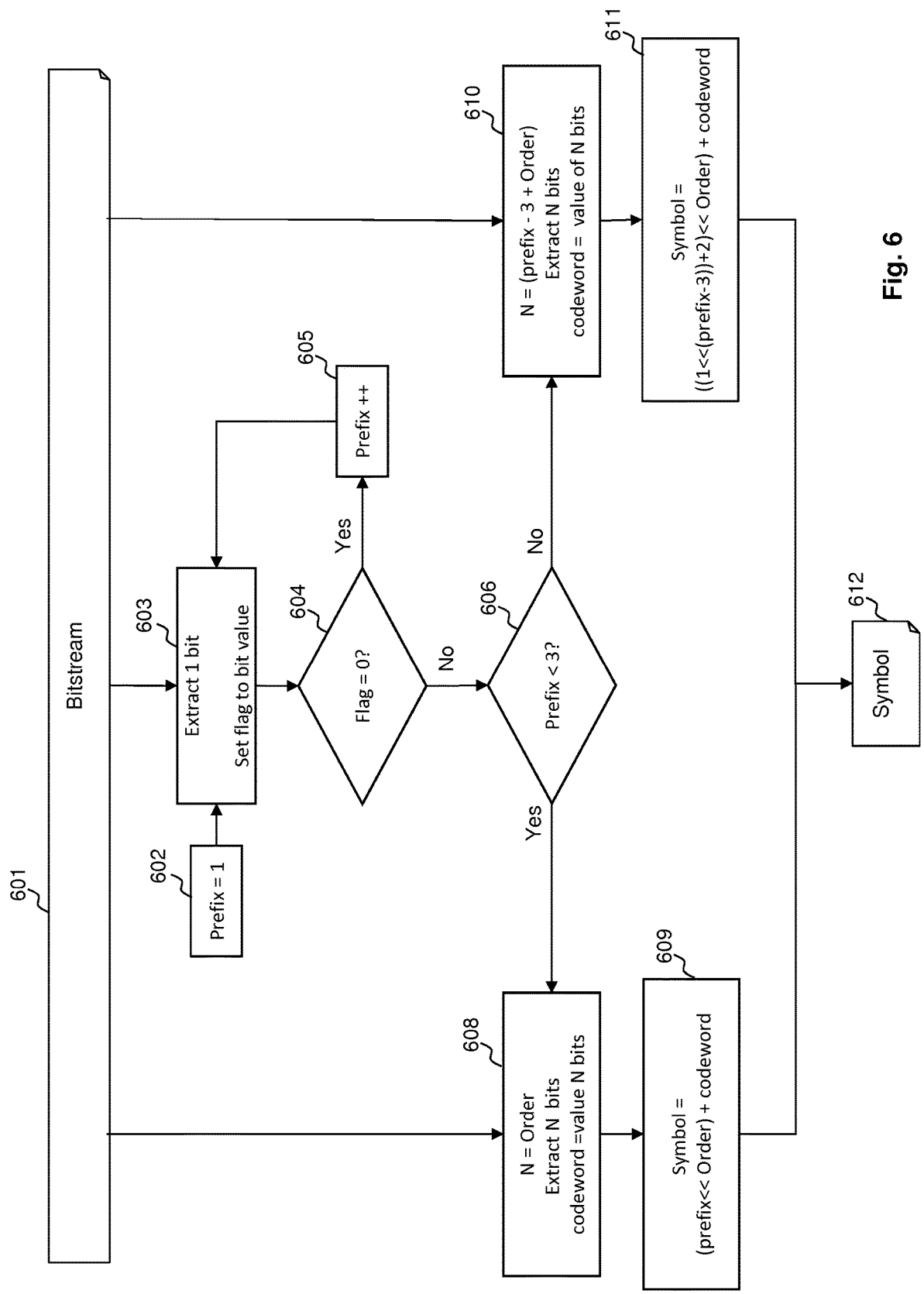
Figure 7:
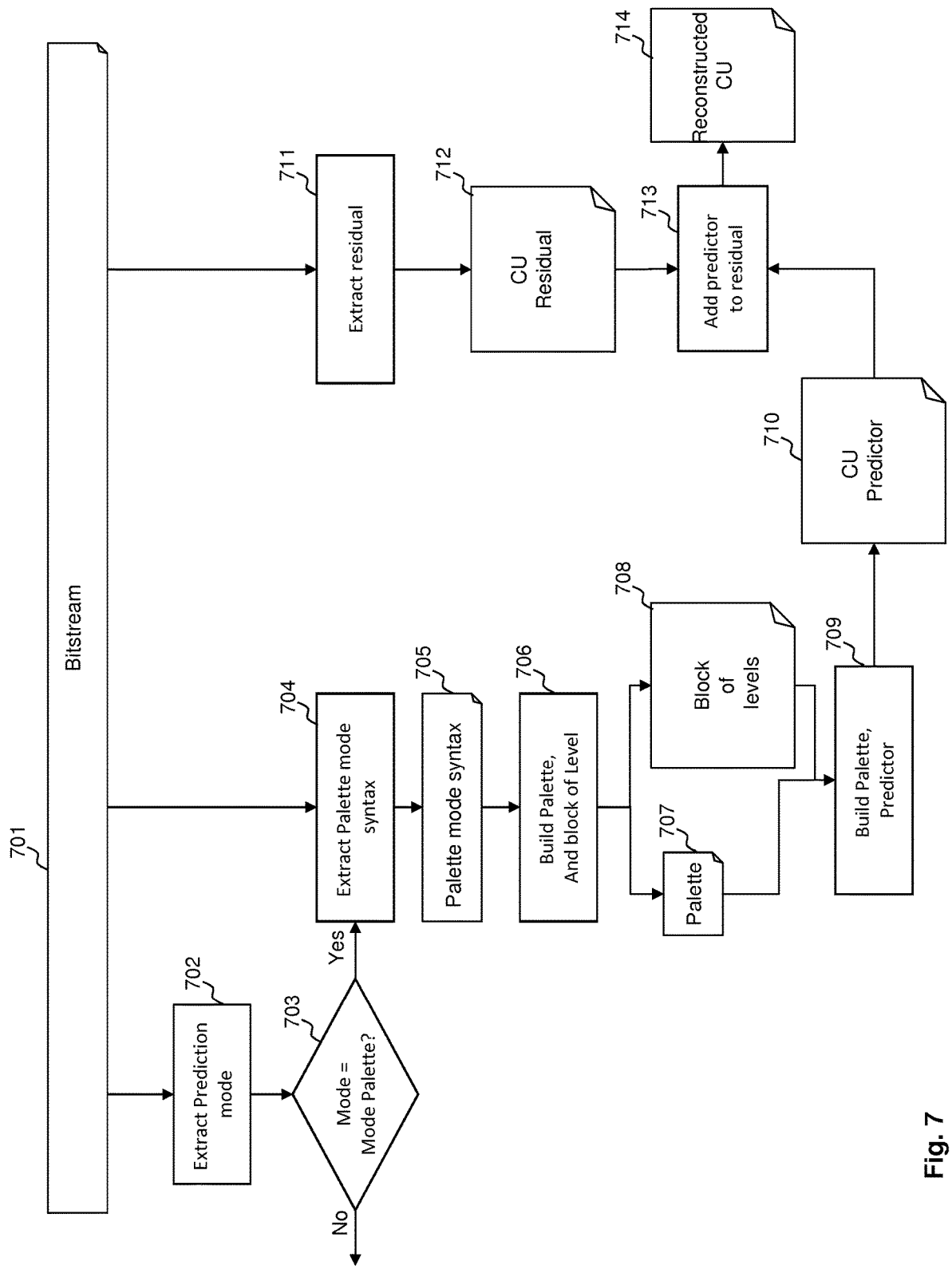
Figure 8:
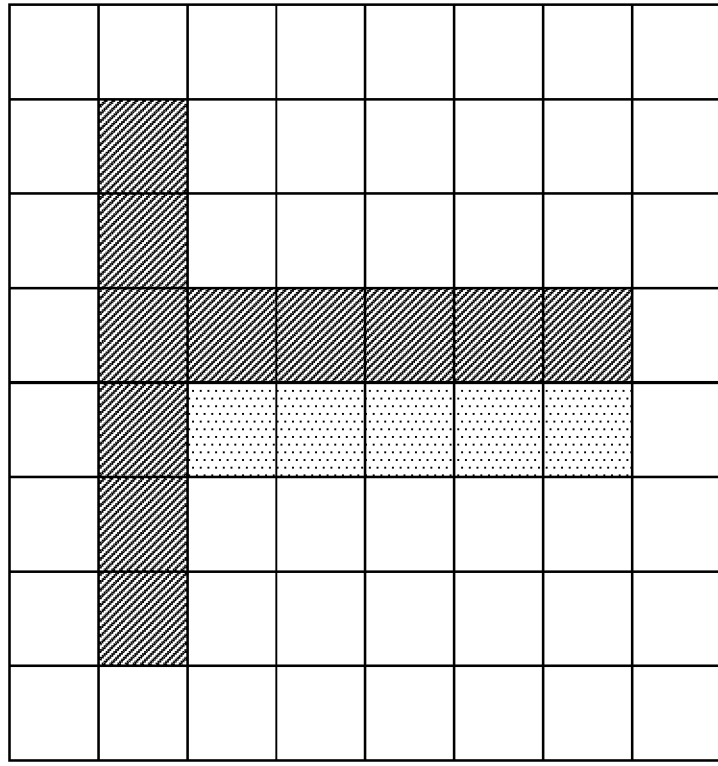
Figure 10:
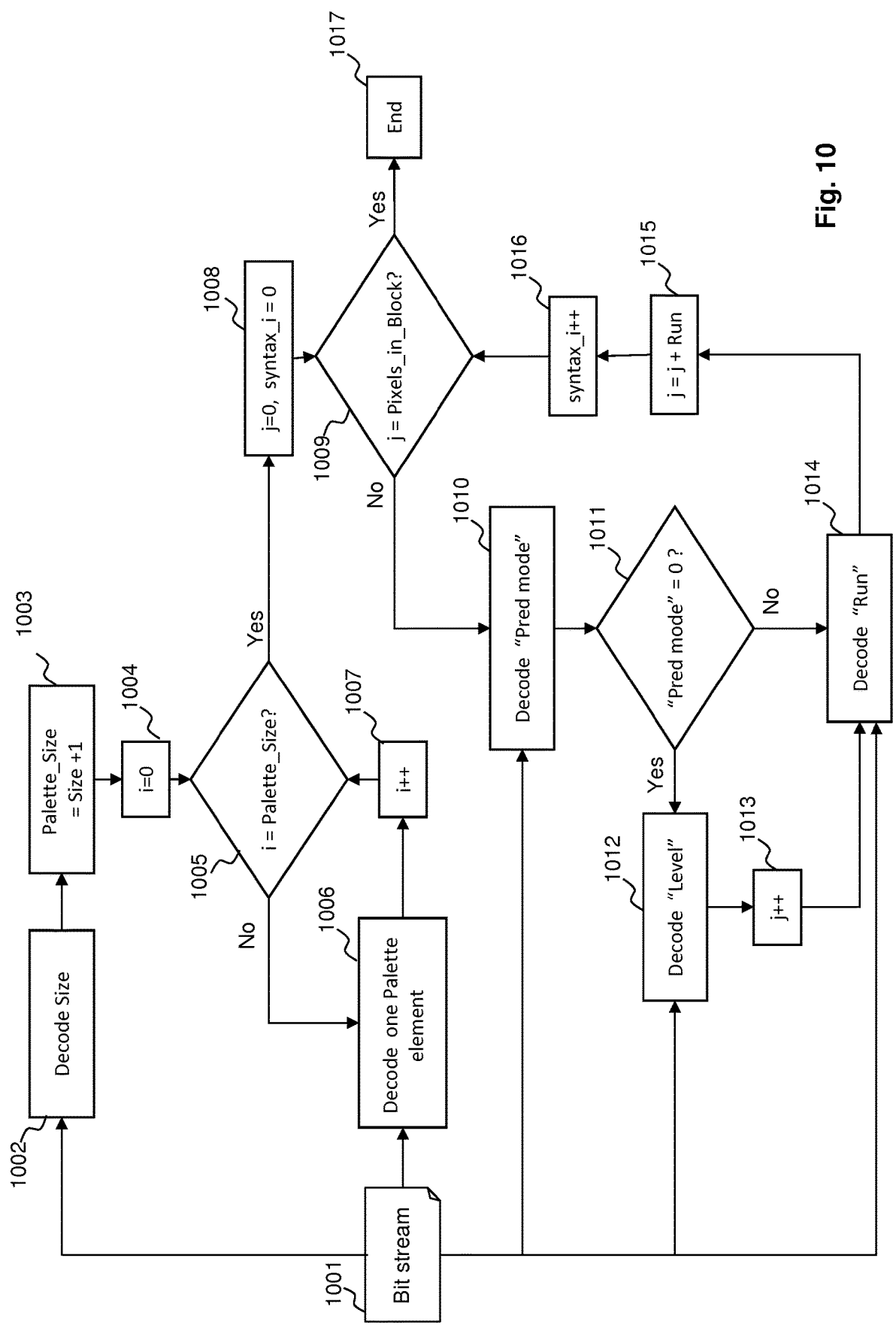
Figure 11:
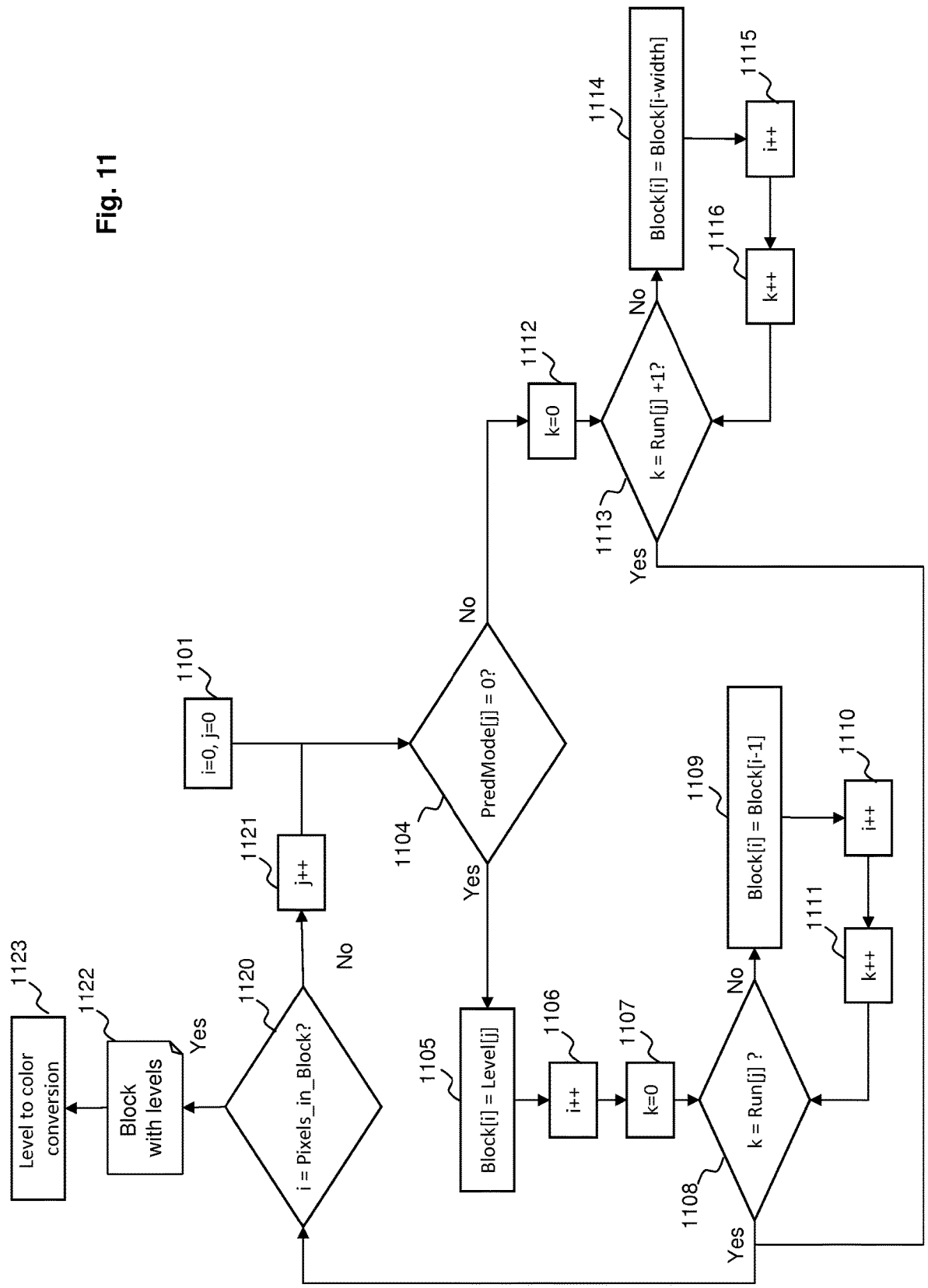
Figure 12:
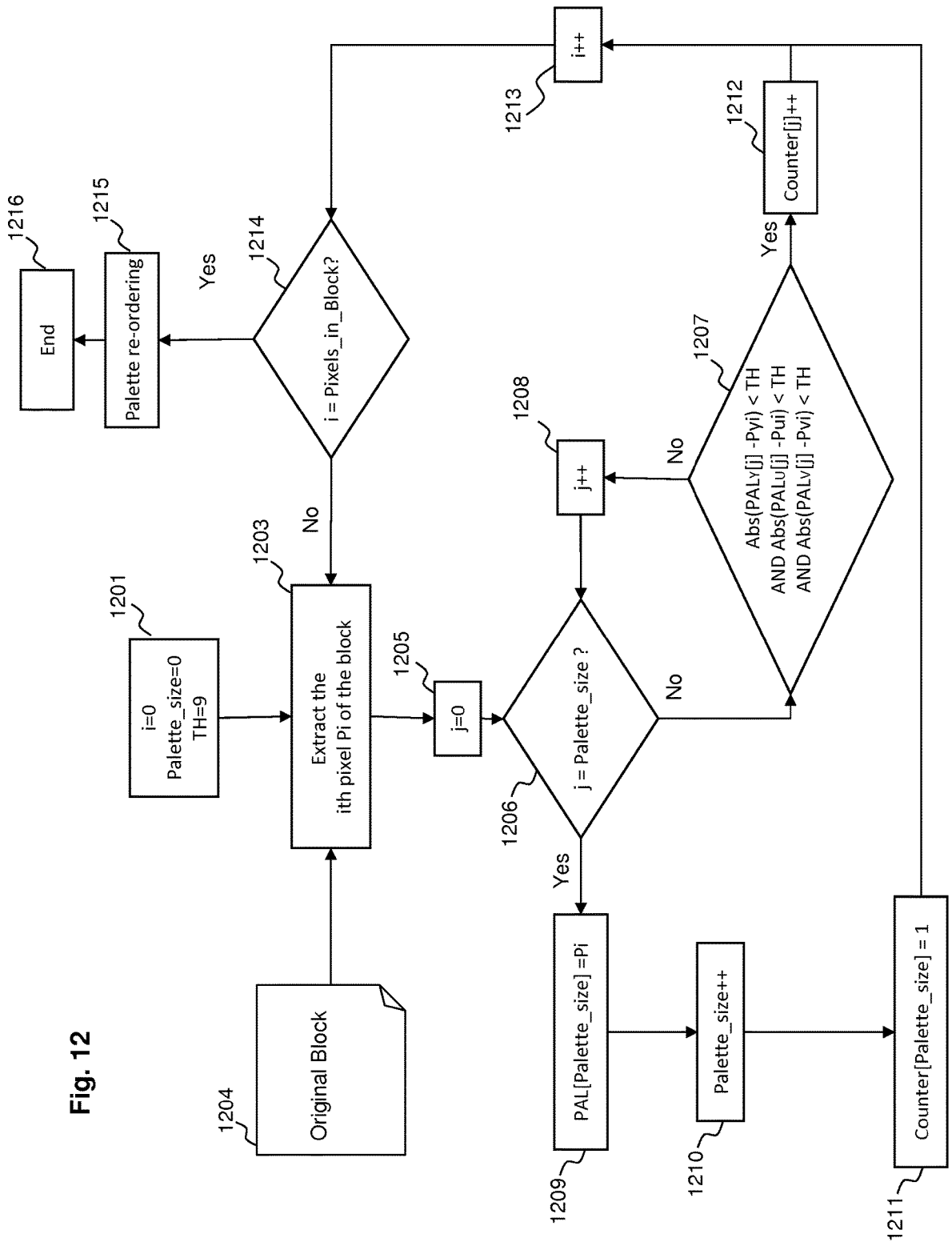
Figure 13:
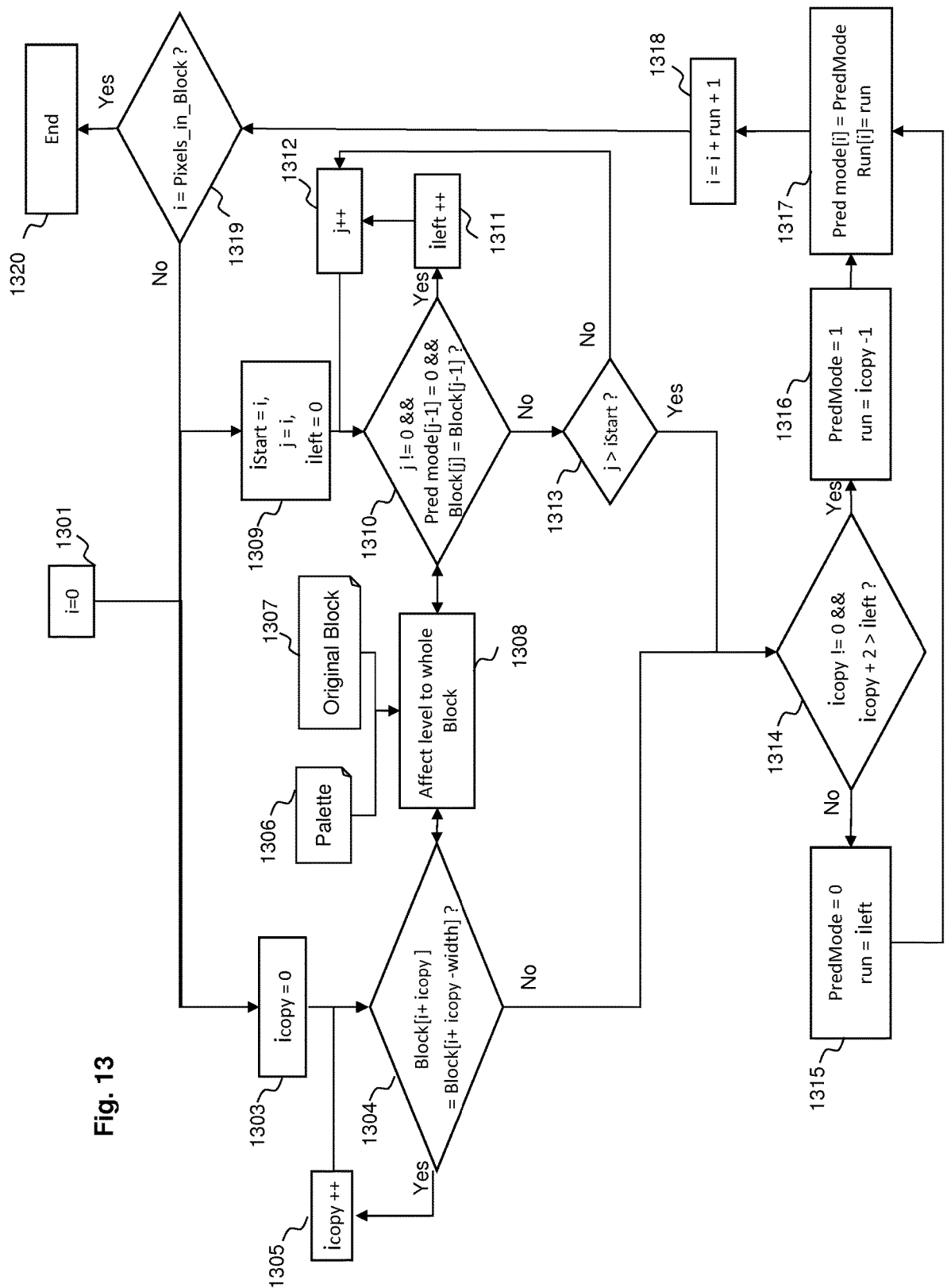
Figure 14:
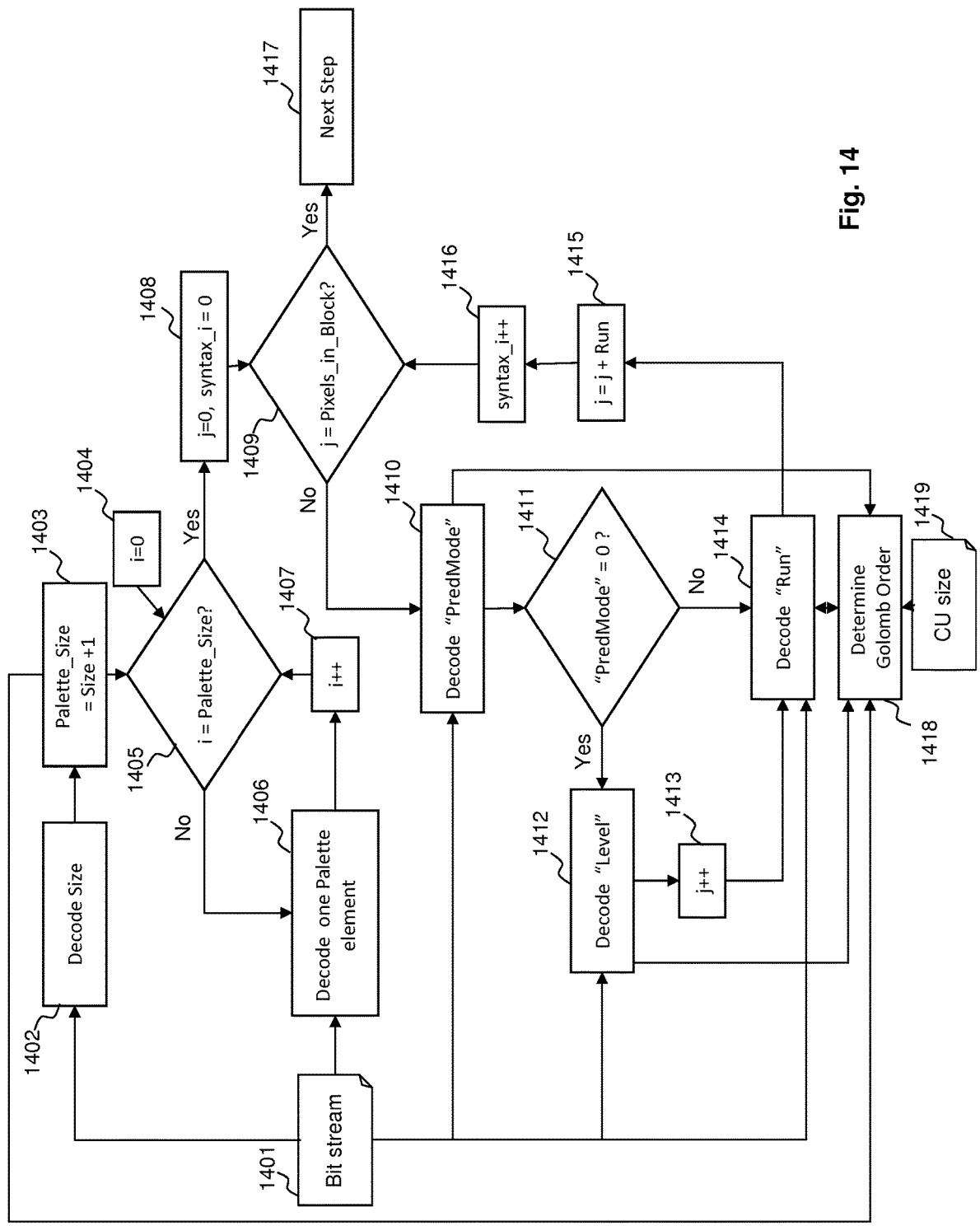
Figure 15:
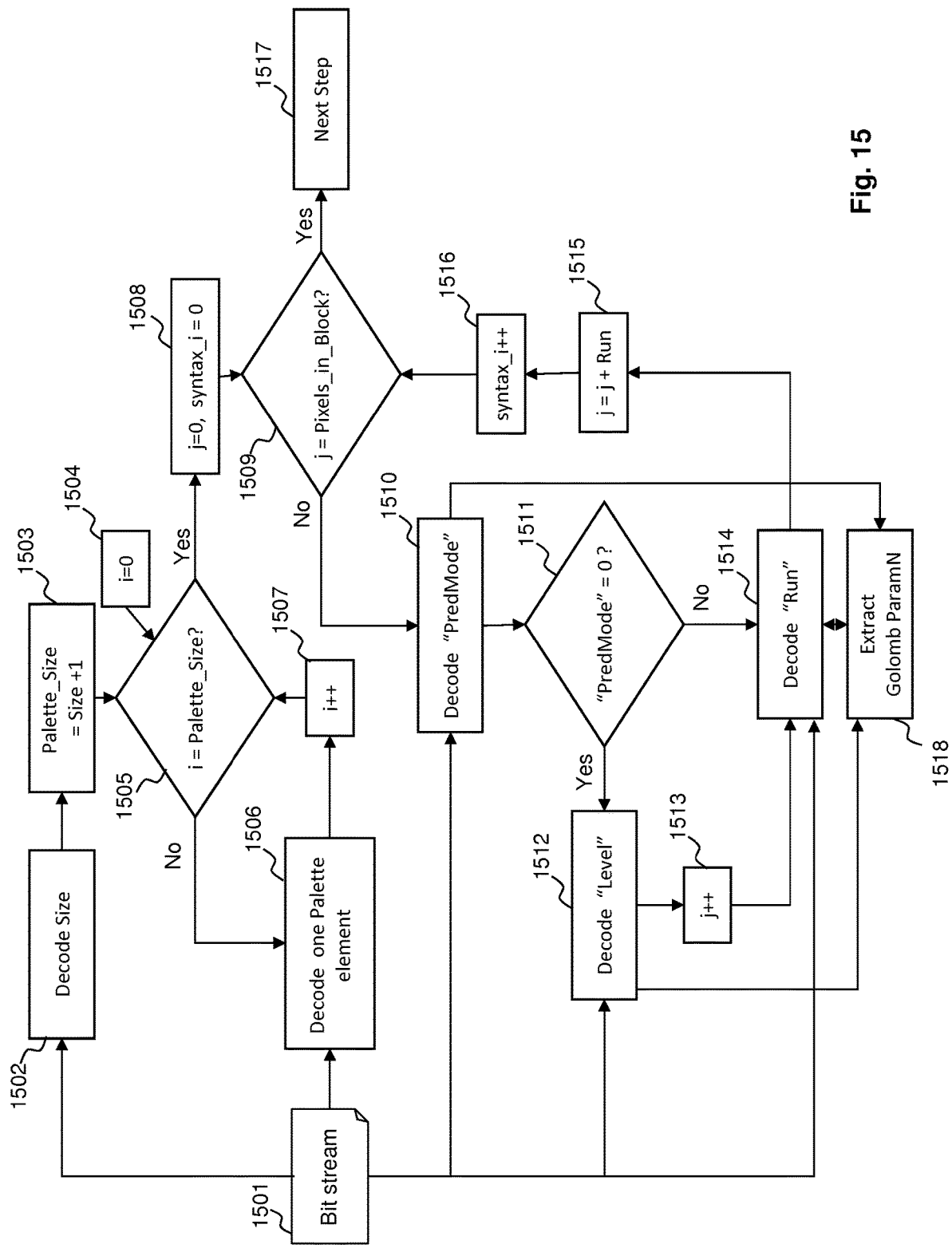
Figure 16:
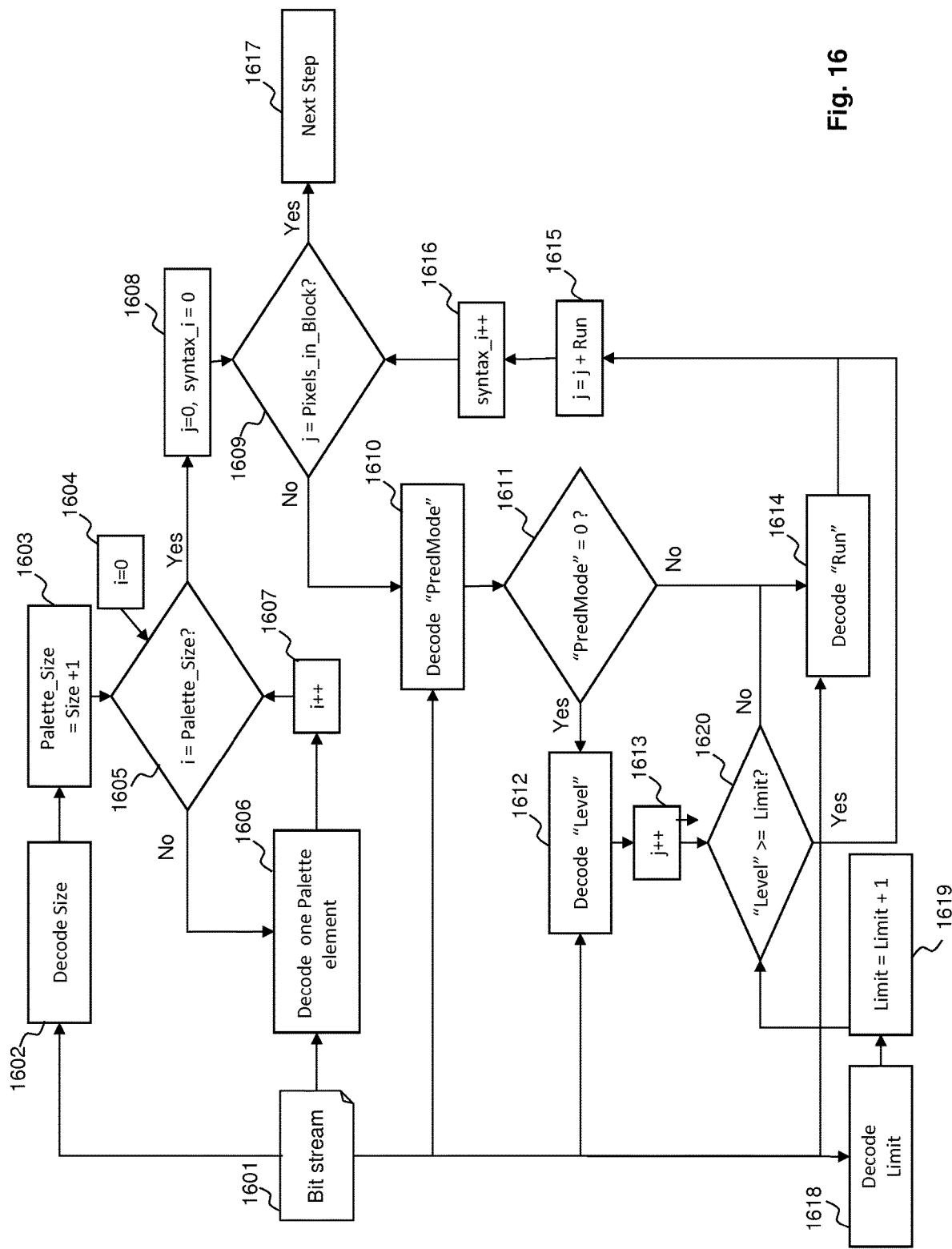
Figure 17:
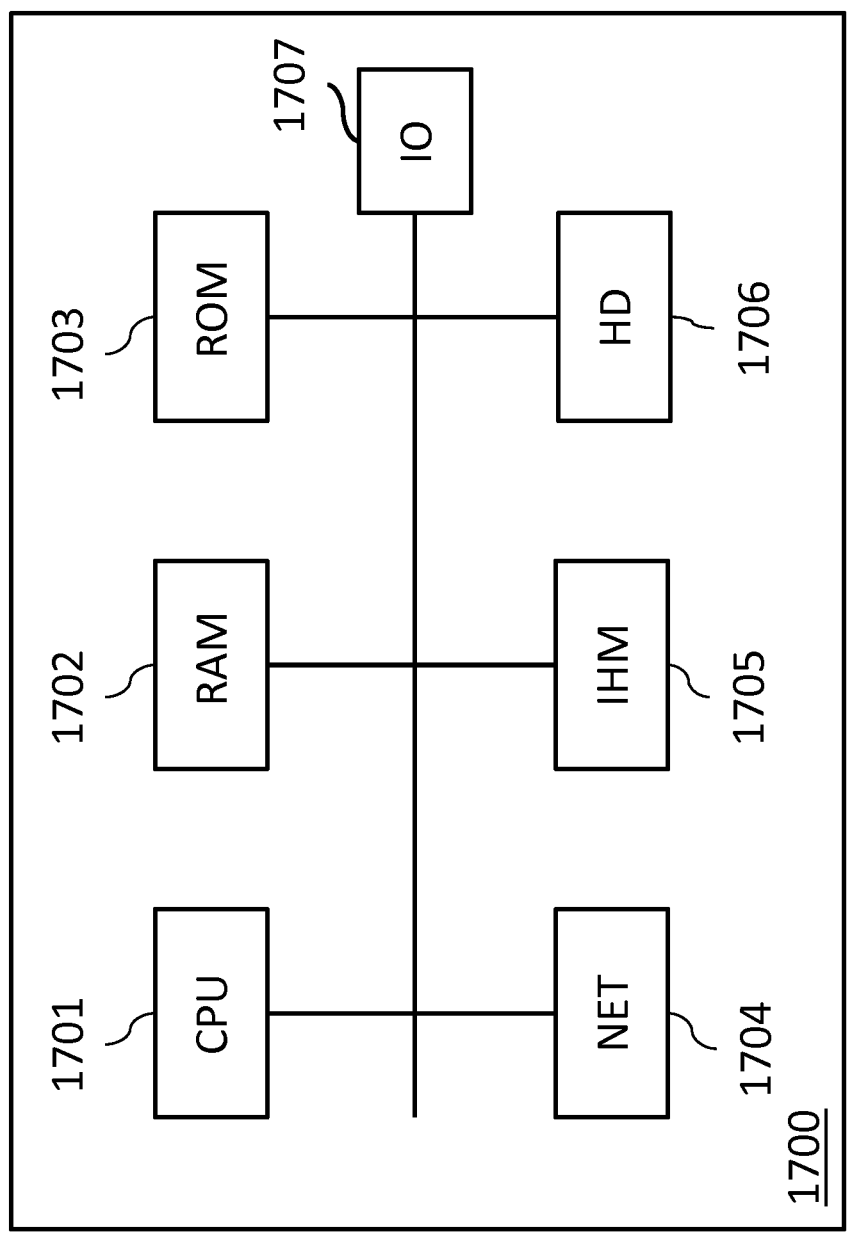

Embodiments of the invention will now be described, by way of example only, and with reference to the following drawings in which:

FIG. 1 illustrates the HEVC encoder architecture;
FIG. 2 illustrates the HEVC decoder architecture;
FIG. 3 illustrates the concept of the causal area;
FIG. 4 illustrates different video formats;
FIG. 5 illustrates the Coding Tree Block splitting in Coding Units and the scan order decoding of these Coding Units;
FIG. 6 illustrates the Golomb based binary coding of a syntax element in HEVC;
FIG. 7 illustrates the principle of Palette mode prediction at the decoder side under investigation in the Range Extension of HEVC;
FIG. 8 illustrates an example of coding unit with its corresponding block of levels and the associated palette;
FIG. 9 illustrates the same block of levels and the set of syntax elements used for the encoding of this block of levels;
FIG. 10 illustrates the decoding process of the syntax elements related to the Palette mode.
FIG. 11 illustrates the reconstruction process to build the block of levels and then the block predictor in the colour space that has to be used as predictor;
FIG. 12 illustrates an exemplary palette determination algorithm at the encoder;
FIG. 13 illustrates the selection of the Pred mode, Level and Run syntax elements at the encoder;
FIG. 14 illustrates an embodiment where the Order value depends on the number of pixels remaining in the block of levels.
FIG. 15 illustrates an embodiment where the Order value is transmitted in the bitstream;
FIG. 16 illustrates an embodiment related to the decoding of a threshold on the Level value used to decide not to transmit the Run value.
FIG. 17 is a schematic block diagram of a computing device for implementation of one or more embodiments of the invention.

FIG. 1 illustrates the HEVC encoder architecture. In the video encoder, an original sequence 101 is divided into blocks of pixels 102. A coding mode is then affected to each block. There are two families of coding modes typically used in HEVC: the modes based on spatial prediction or INTRA modes 103 and the modes based on temporal prediction or INTER modes based on motion estimation 104 and motion compensation 105. An INTRA Coding Unit is generally predicted from the encoded pixels at its causal boundary by a process called INTRA prediction. An extension of HEVC being currently designed, known as HEVC RExt, adds an additional coding mode, namely the Palette coding mode that competes with INTRA and INTER coding modes to encode blocks of pixels. This Palette coding mode is described with more details below, in particular with reference to FIGS. 7 to 13.

Temporal prediction of INTER coding mode first consists in finding in a previous or future frame called the reference frame 116 the reference area which is the closest to the Coding Unit in a motion estimation step 104. This reference area constitutes the predictor block. Next this Coding Unit is predicted using the predictor block to compute the residue in a motion compensation step 105.

In both cases, spatial and temporal prediction, a residual is computed by subtracting the Coding Unit from the original predictor block.

In the INTRA prediction, a prediction direction is encoded. In the temporal prediction, at least one motion vector is encoded. However, in order to further reduce the bitrate cost related to motion vector encoding, a motion vector is not directly encoded. Indeed, assuming that motion is homogeneous, it is particularly interesting to encode a motion vector as a difference between this motion vector, and a motion vector in its surrounding. In H.264/AVC coding standard for instance, motion vectors are encoded with respect to a median vector computed between 3 blocks located above and on the left of the current block. Only a difference, also called residual motion vector, computed between the median vector and the current block motion vector is encoded in the bitstream. This is processed in module "Mv prediction and coding" 117. The value of each encoded vector is stored in the motion vector field 118. The neighboring motion vectors, used for the prediction, are extracted from the motion vector field 118.

Then, the mode optimizing the rate distortion performance is selected in module 106. In order to further reduce the redundancies, a transform, typically a DCT, is applied to the residual block in module 107, and a quantization is applied to the coefficients in module 108. The quantized block of coefficients is then entropy coded in module 109 and the result is inserted in the bitstream 110.

The encoder then performs a decoding of the encoded frame for the future motion estimation in modules 111 to 116. This is a decoding loop at the encoder. These steps allow the encoder and the decoder to have the same reference frames. To reconstruct the coded frame, the residual is inverse quantized in module 111 and inverse transformed in module 112 in order to provide the "reconstructed" residual in the pixel domain. According to the encoding mode (INTER or INTRA), this residual is added to the INTER predictor 114 or to the INTRA predictor 113.

Then, this first reconstruction is filtered in module 115 by one or several kinds of post filtering. These post filters are integrated in the decoding loop. It means that they need to be applied on the reconstructed frame at the encoder and decoder in order to use the same reference frames at the encoder and decoder. The aim of this post filtering is to remove compression artifacts.

The principle of an HEVC decoder has been represented in FIG. 2. The video stream 201 is first entropy decoded in a module 202. The residual data are then inverse quantized in a module 203 and inverse transformed in a module 204 to obtain pixel values. The mode data are also entropy decoded and in function of the mode, t INTRA type decoding or an INTER type decoding is performed. In the case of INTRA mode, the INTRA prediction direction is decoded from the bitstream. The prediction direction is then used to locate the reference area 205. If the mode is INTER, the motion information is decoded from the bitstream 202. This is composed of the reference frame index and the motion vector residual. The motion vector predictor is added to the motion vector residual to obtain the motion vector 210. The motion vector is then used to locate the reference area in the reference frame 206. Note that the motion vector field data 211 is updated with the decoded motion vector in order to be used for the prediction of the next decoded motion vectors. This first reconstruction of the decoded frame is then post filtered 207 with exactly the same post filter as used at encoder side. The output of the decoder is the de-compressed video 209.

FIG. 3 illustrates the causal principle resulting from block-by-block encoding as in HEVC.

At a high-level, an image is divided into Coding Units that are encoded in raster scan order. Thus, when coding block 3.1, all the blocks of area 3.3 have already been encoded, and can be considered available to the encoder. Similarly, when decoding block 3.1 at the decoder, all the blocks of area 3.3 have already been decoded and thus reconstructed, and can be considered as available at the decoder. Area 3.3 is called the causal area of the Coding Unit 3.1. Once Coding Unit 3.1 is encoded, it will belong to the causal area for the next Coding Unit. This next Coding Unit, as well as all the next ones, belongs to area 3.4 illustrated as doted area, and cannot be used for coding the current Coding Unit 3.1. It is worth noting that the causal area is constituted by reconstructed blocks. The information used to encode a given Coding Unit is not the original blocks of the image for the reason that this information is not available at decoding. The only information available at decoding is the reconstructed version of the blocks of pixels in the causal area, namely the decoded version of these blocks. For this reason, at encoding, previously encoded blocks of the causal area are decoded to provide this reconstructed version of these blocks.

It is possible to use information from a block 3.2 in the causal area when encoding a block 3.1. In the HEVC Range Extension draft specifications, a displacement vector 3.5, which can be transmitted in the bitstream, may indicate this block 3.2.

FIG. 5 illustrates a splitting of a Coding Tree Block into Coding Units and an exemplary scan order to sequentially process of these Coding Units. In the HEVC standard, the block structure is organized by Coding Tree Blocks (CTBs). A frame contains several non-overlapped and square Coding Tree Block. The size of a Coding Tree Block can be equal to 64×64 to 16×16. This size is determined at sequence level. The most efficient size, in term of coding efficiency, is the largest one: 64×64. Please note that all Coding Tree Blocks have the same size except for the image border. The size of the boundary CTBs is adapted according to the amount of remaining pixels.

Each Coding Tree Block contains one or more square Coding Units (CU). The Coding Tree Block is split based on a quad-tree structure into several Coding Units. The processing (coding or decoding) order of each Coding Unit in the Coding Tree Block follows the quad-tree structure based on a raster scan order. FIG. 5 shows an example of the processing order of Coding Units. In this figure, the number in each Coding Unit gives the processing order of each corresponding Coding Unit of this Coding Tree Block.

In HEVC, several methods are used to code the different syntax elements, for example block residuals, information on predictor blocks (motion vectors, INTRA prediction directions, etc.). HEVC uses several types of entropy coding like the Context based Adaptive Binary Arithmetic Coding (CABAC), Golomb-rice Code, or simple binary representation called Fixed Length Coding. Most of the time, a binary encoding process is performed to represent the different syntax element. This binary encoding process is also very specific and depends on the different syntax elements.

For example, the syntax element called "coeff_abs_level_remaining" contains the absolute value or a part of an absolute of the coefficient residual. The idea of this binary encoding process is to use Golomb-Rice code for the first values and Exponential Golomb for the higher values. More specifically, depending on a given parameter called Golomb Order, this means that for representing the first values, for example values from 0 to 3, a Golomb-Rice code is used, then for higher values, for example values from 4 and above, an Exponential Golomb code is used. The Golomb Order is a parameter used by both the Golomb-Rice code and the exponential Golomb code.

FIG. 6 illustrates this principle at the decoding side. The input data of the decoding process are the bitstream 601 and the Order which is known as the Rice Golomb parameter, or the Golomb Order. The output of this process is the decoded symbol 612.

The prefix value is set equal to 1 at step 602 then 1 bit is extracted from the bitstream at step 601 and the variable flag is set equal to the decoded value 603. If this flag is equal to 0 at step 604 the Prefix value is incremented 605 and another bit is extracted from the bitstream 603. When the flag value is equal to 1, the decision module 606 checks if the value Prefix is strictly inferior to 3. If it is true, the N=Order bits are extracted 608 from the bitstream 601 and set to the variable "codeword". This corresponds to the Golomb-Rice representation. The Symbol value 612 is set equal to ((prefix<<Order)+codeword) as depicted in step 609. Where '<<' is the left shift operator.

If the Prefix is superior or equal to 3 at step 606, the next step is 610 where N=(prefix−3+Order) bits are extracted from the bitstream and set to the variable "codeword" 610. The symbol value 611 is set equal to ((1<<(prefix−3))+2)<<Order)+codeword. This corresponds to the exponential Golomb representation.

In the following, this decoding process, and in a symmetric way the corresponding encoding process, is called Golomb_H with an input parameter corresponding to the Golomb Order. It can be noted in a simple way Golomb_H (Order).

In HEVC, for some syntax elements such as residuals, the Golomb Order is updated in order to adapt the entropy coding to the signal to be encoded. The updating formula tries to reduce the Golomb code size by increasing the Golomb Order when the coefficients have large values. In the HEVC standard, the update is given by the following formula:

Order=Min(*c*LastRiceOrder+(*c*LastAbsLevel>(3* (1<<*c*LastRiceOrder))?1:0),4)

Where cLastRiceOrder is the last used Order, cLastAbsLevel is the last decoded coeff_abs_level_remaining. Please note that for the first parameter to be encoded or decoded, cLastRiceOrder and cLastAbsLevel are set equal to 0. Moreover please note that the parameter Order cannot exceed the value of 4 in this formula. And where the expression (C?A:B) has the value A if the condition C is true and B if the condition C is false.

The HEVC Range Extension, also commonly called HEVC RExt, is an extension that is currently being drafted of the new video coding standard HEVC.

An aim of this extension is to provide additional tools to code video sequences with additional colour formats and bit-depth, and possibly losslessly. In particular, this extension is designed to support 4:2:2 colour format as well as 4:4:4 video format in addition to 4:2:0 video format (see FIG. 4). A colour image is generally made of three colour components R, G and B. These components are generally correlated, and it is very common in image and video compression to de-correlate the colour components prior to processing the images. The most common format that de-correlates the colour components is the YUV colour format. YUV signals are typically created from RGB representation of images, by applying a linear transform to the three inputs R, G and B input frames. Y is usually called Luma component, U and V are generally called Chroma components. The term 'YCbCr' is also commonly used in place of the term 'YUV'.

Regarding the bit-depth which is the number of bits used to code each colour component of a pixel, if the current HEVC standard is able to deal with 4:2:0 colour format with 8 and 10 bits bit-depth (i.e. 256 to 1,024 possible colours), HEVC RExt is about to be designed to additionally support 4:2:2 and 4:4:4 video format with an extended bit-depth ranging from 8 bits up to 16 bits (i.e. up to 65,536 possible colours). This is particularly useful to have a larger dynamic of colour components.

HEVC RExt is also designed to provide a lossless encoding of the input sequences; this is to have a decoded output 209 strictly identical to the input 101. To achieve this, a number of tools have been modified or added, compared to the conventional HEVC lossy codec. A non-exhaustive list of exemplary modifications or additions to operate losslessly is provided here below:

removal of the quantization step 108 (203 at the decoder);

forced activation of the bypass transform, as normal cosine/sine transforms 107 may introduce errors (204 at the decoder);

removal of tools specifically tailored at compensating quantization noise, such as post filtering 115 (207 at the decoder).

For HEVC RExt, the updating formula of the Golomb Order has been further modified in order to be adapted to deal with higher bit-depth and to take into account very high quality required by application dealing with video compression of extended format (4:2:2 and 4:4:4) including lossless coding. For HEVC RExt, the updating formula has been changed as follows:

Order=Min(*c*LastRiceOrder+(*c*LastAbsLevel>>(2+ *c*LastRiceOrder)),7)

With this formula, the maximum value of Order is 7. Moreover, for the first coding of the coeff_abs_level_remaining for a sub-block of Transform block, the Golomb order is set equal to:

Order=Max(0,*c*RiceOrder−(transform_skip_ flag||cu_transquant_bypass_flag?1:2))

where the variable "transform_skip_flag" is set to 1 if the transform (e.g. DCT 107 or 204) is skipped for the current coding unit and 0 if the transform is used, the variable "cu_transquant_bypass_flag" is set to 1 if the coding unit is lossless encoded and 0 otherwise, the variable "cRiceOrder" is set equal to last used Order from another sub-block of the transform block otherwise is set to 0.

Additional tools for HEVC RExt are currently being designed to efficiently encode "screen content" video sequences in addition to natural sequences. The "screen content" video sequences refer to particular video sequences which have a very specific content corresponding to those captured from a personal computer of any other device containing for example text, PowerPoint presentation, Graphical User Interface, tables (e.g. screen shots). These particular video sequences have quite different statistics compared to natural video sequences. In video coding, performance of conventional video coding tools, including HEVC, proves sometimes to be underwhelming when processing such "screen content".

The current tools currently discussed on in HEVC RExt to process "screen content" video sequences include the Intra Block Copy mode and the Palette mode. Prototypes for these modes have shown good coding efficiency compared to the conventional method targeting natural video sequences. Focus is made in this document on the Palette coding mode.

The palette mode of HEVC RExt is a prediction mode. It means that the Palette method is used to build a predictor for the coding of a given coding unit similarly to a prediction performed by motion prediction (Inter case) or by an Intra prediction. After the generation of the prediction, a residual coding unit is transformed, quantized and coded. In other words, the same processes as described above with reference to FIGS. 1 and 2 apply.

A palette is generally represented by a table containing a finite set of N-tuple of colors, each color being defined by its components in a given colour space (see for example 803 in FIG. 8 based on YUV colour space). For example, in a typical RGB format, the palette is composed of a list of P elements of N-tuple (where N=3 for a RGB). More precisely, each element corresponds to a fixed triplet of colour components in the RGB format. Of course, this is not limited to a RGB or YUV colour format. Any other colour format can be represented by a palette and can use a smaller or a higher number of colour components, meaning that N may be different from 3.

At the encoder side, the Palette mode, under consideration in RExt, consists in transforming pixel values of a given input coding unit into indexes called levels identifying the entries in an associated palette. After the transformation, the resulting coding unit or block is composed of levels and is then transmitted to the decoder with the associated palette, generally a table having a finite number of triplets of colours used to represent the coding unit. Since the palette defines a finite number of colours, the transformation into a block of indexes usually approximates the original input coding unit.

To apply the Palette mode at the encoder side, an exemplary way to transform a coding unit of pixels is performed as follows:
  find the P triplets describing at best the coding unit of pixels to encode, for example by minimizing overall distortion;
  then associate with each pixel of the coding unit the closest colour among the P triplets: the value to encode (or level) is then the index corresponding to the entry of the associated closest colour.

For each coding unit, the palette (i.e. the P triplets found), the block of indexes or levels and the residual representing the difference between the original coding unit and the block of indexes in the colour space (which is the block predictor) are coded in the bitstream 110 and sent to the decoder.

At the decoder, the Palette mode consists in operating the conversion in the reverse way. This means that each decoded index associated with each pixel of the coding unit is replaced by the corresponding colour in the palette decoded from the bitstream, in order to reconstruct the corresponding colour for each pixel of the coding unit. This is the reconstruction of the block of indexes in the colour space (i.e. of the coding unit predictor). Since the Palette mode is a prediction mode, the associated residual is decoded from the bitstream and then added to the reconstructed coding unit predictor to build the final reconstructed coding unit.

FIG. 7 further illustrates the principle of Palette mode at the decoder. The prediction mode for the current coding unit is extracted at step 702 from the bitstream 701. Currently, the Palette mode is identified by a flag located before the skip flag in the bitstream (the other coding modes have been described above with reference to FIGS. 1 and 2). This flag is CABAC coded using a single context. If this mode is the Palette mode 703 then the related syntax of the Palette mode 705, i.e. the information on the palette, the block of levels and the residual, is extracted and decoded 704 from the bitstream 701.

Then, during step 706, two elements are built from the decoded data: the palette 707 and the block of levels 708. From this block of levels and the associated palette, the coding unit predictor in pixel domain 710 is built 709. It means that for each level of the block of levels, a color (RGB or YUV) is associated to each pixel.

Then the coding unit residual is decoded 711 from the bitstream 701. In the current implementation Palette mode, the residual associated with a Palette mode is coded using the common HEVC Inter residual coding method, i.e. using Golomb coding. To obtain the residual of the coding unit, the conventional inverse quantization and inverse transformation are performed. The block predictor 710 is added 713 to this coding unit residual 712 in order to form the reconstructed coding unit 714.

FIG. 8 illustrates the principle of the Palette mode at the encoder. The current coding unit 801 is converted into a block 802 of the same size which contains a level for each pixel instead of 3 colour values (Y, U, V) or (R, G, B). The palette 803 associated with this block of levels is built based on coding unit overall distortion minimization and associates at each entry, an entry index or level with corresponding pixel colour values. Please note that for monochrome application, the pixel value can contain only one component.

As mentioned in relation to FIG. 7, the palette (as well as the residual) is coded and inserted in the bitstream for each coding unit. In the same way, the block of levels (corresponding to the coding unit predictor) is coded and inserted in the bitstream and an example of the coding is given below with reference to FIG. 9. In this example, the block of levels is scanned in a horizontal order.

The block of levels 91 is exactly the same as the one illustrated in FIG. 8 under reference 802. The tables 92 and 93 describe the successive syntax elements used to code the block of levels 91. Table 93 should be read as the continuation of table 92. The syntax elements in the table correspond to the encoding of the groups of levels surrounded by bold lines in the block 91.

The block of levels is encoded by group of successive pixels in scan order. Each group is encoded using a first syntax element giving a prediction direction, a second element giving the repetition, and an optional third element giving the value of the pixel, namely the level. The repetition corresponds to the number of pixels in the group.

These two tables depict the current syntax associated to the Palette mode. These syntax elements correspond to the encoded information associated in the bitstream for the block of levels 91. In these tables, three main syntax elements are used to fully represent the operations of the Palette mode and are used as follows when successively considering the levels of the block of levels 91.

A first syntax element, called "Pred mode" allows to distinguish between two encoding modes. In a first mode corresponding to "Pred mode" flag equal to "0", a new level is used for the current pixel. The level is immediately signaled after this flag in the bitstream. In a second mode corresponding to "Pred mode" flag equal to "1", a "copy up" mode is used. More specifically, this means that the current pixel level corresponds to the pixel level located at the line immediately above starting on the same position for a raster scan order. In that case of "Pred mode" flag equal to "1", there is no need to signal a level immediately after the flag because the value of the level is known by reference to the value of the level of the pixel just above in the block of levels 91.

A second syntax element called "Level" indicates the level value of the palette for the current pixel only in the first mode of "Pred mode".

A third syntax element, called "Run", is used to encode a repetition value in both modes of "Pred mode". Considering that the block of levels 91 is scanned from the top left corner to the bottom right corner, row by row from left to right and top to bottom, the Run syntax element gives the number of successive pixels in block 91 having the same encoding.

This "Run" syntax element has a different meaning which depends on the "pred mode" flag. When Pred mode is 0, "Run" element is the number of successive pixels of the predictor block having the same level value. For example, if Run=8 this means that the current "Level" is applied to the current pixel and to the following 8 pixels which corresponds to 9 identical successive samples in raster scan order.

When Pred mode is 1, "Run" element is the number of successive pixels of the predictor block having a level value corresponding to the level value of their above pixel in block 91, i.e. where the "copy up" mode is applied. For example, if Run=31 this means that the level of the current pixel is copied from the pixel of the line above as well as the following 31 pixels which corresponds to 32 pixels in total.

Regarding tables 92 and 93, represent the eight steps to represent the block 91 by using the Palette mode. Each step starts with the coding of the "Pred mode" flag which is followed by the "Level" syntax element when "Pred mode" flag equals "0", or by the "Run" syntax element when "Pred mode" flag equals "1". The "Level" syntax element is always followed by a "Run" syntax element.

When the prediction mode decoded for the current block is the palette mode, the decoder first decodes the syntax related to this block and then applied the reconstruction process for the coding unit.

FIG. 10 illustrates the decoding process of the syntax elements related to the Palette mode. First, the size of the palette is extracted and decoded 1002 from the bitstream 1001. The exact size of the palette (Palette_size) is obtained by adding 1 to this size value decoded at step 1002. Indeed, the size is coded by using a unary code for which the value 0 has the smallest number of bits (1 bit) and the size of the palette cannot be equal to 0, otherwise no pixel value can be used to build the block predictor.

Then the process corresponding to the palette values decoding starts. A variable "i" corresponding to the index of the palette is set equal to 0 at step 1004 next a test is performed at step 1005 to check if "i" is equal to the palette size (Palette_size). If it is not the case, one palette element is extracted from the bitstream 1001 and decoded 1006 and is then added to the palette with the associated level/index equal to "i". Then the variable "i" is incremented through step 1007. If "i" is equal to the palette size 1005, the palette has been completely decoded.

Next the process corresponding to the decoding of the block of levels 91 is performed. First, the variable j, corresponding to a pixel counter, is set to 0 as well as the variable syntax_i 1008. Then a check is performed to know if the pixel counter corresponds to the number of pixels contained in the block. If the answer is yes at step 1009 the process ends at step 1017, otherwise the value of the flag "Pred mode" corresponding to one prediction mode is extracted from the bitstream 1001 and decoded 1010.

The value of "Pred mode" is added to a table at the index syntax_i containing all "Pred mode" value decoded. If the value of this "Pred mode" is equal to 0, step 1011, the syntax element corresponding to "Level" is extracted from the bitstream 1001 and decoded 1012. This variable "Level" is added to a table at the index syntax_i containing all levels decoded. The variable j corresponding to the pixel counter is incremented by one 1013.

Next the "Run" syntax element is decoded at step 1014. If the syntax element "Pred Mode" is equal to 1, step 1011, the "Run" value is also decoded at step 1014. This syntax element "Run" is added to a table at the index syntax_i containing all the runs decoded.

Next at step 1015, the value j is incremented by the value of the run decoded at step 1014. The variable syntax_i is incremented by one to consider the next set of syntax elements. If the counter j is equal to the number of pixels in the block then the syntax to build the block of levels 91 is finished 1017. At the end of this process related to the Palette, the decoder knows the palette, and the tables containing the list of all the "Pred mode", "Level" and "Run" syntax elements associated with the Palette mode of this coding unit. The decoder can then proceed with the reconstruction process of the coding unit as described through FIG. 7.

Each palette element, constituted by three values in the above examples, is generally encoded using three binary codes. The length of the binary codes corresponds to the bit-depth of each color component. The palette size is typically encoded using unary code. The "Pred mode" element is encoded using one bit. The "Level" element is encoded using binary code with binary code length equal to b, where $2^b$ is the smallest integer equal or above the palette size. And the "Run" element is encoded using Golomb_H (Order=3) as explained above in relation to FIG. 6.

FIG. 11 illustrates the reconstruction process to build the block of levels 91 and then the block predictor in the colour space that has to be used as predictor. The input data of this process are the tables obtained in the process of FIG. 10 above, and containing the list of "Pred mode", "Level" and "Run". An additional input data is the size of the coding unit 801 (which is the same as the size of the block of levels 802/91) known from the quadtree (FIG. 5) signalled in the bitstream.

In a first step 1101, a variable "i", representing a pixel counter, is set equal to 0 and a variable "j", to successively consider each set of syntax elements, is also set equal to 0. At step 1104, the element Pred_mode[j] extracted from the table of "Pred mode" at index j is checked against 0.

If it is equal to 0, a new level is encoded for the current pixel "i". As a consequence, the value of the pixel at position "i" is set equal to the level at the index "j" from the table of levels; Block[i]=Level[j]. This is step 1105. The variable "i" is incremented by one at step 1106 to consider the next pixel, and the variable "k", dedicated to count the pixels already processed in the current Run, is set equal to 0 at step 1107.

A check is performed at step 1108 to determine whether or not k is equal to the "Run" element of the table of runs at the index j:k=Run[j] ?. If not equal, the level of the pixel at position i is set equal to the level value of the pixel at position i−1: Block[i]=Block[i−1]. This is step 1109. The variable i and the variable k are then incremented by one at respectively steps 1110 and 1111. If k=Run[j] at step 1108, the propagation of the left level value is finished and step 1120 is performed (described below).

If Pred_mode[j] is different from 0 at step 1104, the "copy up" mode starts with the variable "k" set equal to 0 at step 1112. Next, step 1113 checks whether or not (k−1) is equal to the "Run" element of the table of runs at the index "j":k=Run[j]+1? If not equal, the level value of the pixel at position i is set equal to the level value of the pixel at position i of the above line: Block[i]=Block[i−width], where "width" is the width of the block of levels (the same as the coding unit) as deduced from the input size of the coding unit. This is step 1114. Next, the variable "i" and the variable "k" are incremented by one at respectively steps 1115 and 1116. If k=Run[j]+1 at step 1113, the prediction mode 'copy up' is completed and the process goes on at step 1120.

At step 1120, a check is performed to determine whether or not the variable i is equal to the amount of pixels in the block 91/CU 801. If not equal, the variable j is incremented by one at step 1121 to consider the next set of syntax elements and the process loops back to step 1104 described above.

If all the pixels have been processed at step 1120, the final block of levels 91 is obtained at step 1122: this corresponds to table Block[ ]. Then a final step 1123 consists in converting each level in colour values using the palette 803 decoded using the process of FIG. 10. This final step affects pixel values (Y, U, V) or (R, G, B) at each block position according to the level of this position in the block and the corresponding entries in the palette.

Other aspects of the palette mode as introduced in HEVC RExt regard the determination by the encoder of the palette to be used to encode the current coding unit (see FIG. 12 below), and the selection of the Pred mode, Level and Run syntax elements at the encoder (see FIG. 13 below).

FIG. 12 illustrates an exemplary palette determination algorithm at the encoder. The input data of this process are the original coding unit of pixels and its coding unit size. In this example, a YUV palette is built, but other implementations may result in having a RGB palette built in the same way.

At a first step 1201, a variable j representing a pixel counter is set to 0, a variable "Palette_size" to follow the growth of the palette as it is being built is also set to 0, and a variable "TH" representative of a threshold is set to 9. Then at step 1203, the pixel $p_i$, i.e. having the index i according to a scanning order, is read at step 1203 from the original coding unit 1204. Then the variable j is set equal to 0 at 1205 and at step 1206 a check is performed to determine whether or not the palette size is equal to the variable "j" (meaning that all the palette elements of the palette under construction has been considered).

If the palette size is equal to j, the palette at the index "j" is set equal to the pixel value $p_i$ at step 1209. This means that the current pixel $p_i$ becomes a new element in the palette, with index j associated with it. More precisely the following assignment is performed:

$PAL_Y[j]=(Yi)$ $PAL_U[j]=(Ui)$ $PAL_V[j]=(Vi)$ where $PAL_{Y,U,V}$ are three tables to store the colour values.

The palette size (Palette_size) is incremented by one at step 1210 and an occurrence table Counter is set equal to 1 for the index 'Palette size' at step 1211. Then the variable i is incremented by one at step 1213 to consider the next pixel "i" of the current coding unit. A check is then performed at step 1214 to determine whether or not all the pixels of the current coding unit have been processed. If they have all been processed, the process is completed by an ordering step 1215 explained later on, otherwise the next pixel is considered at step 1203 described above.

Back to step 1206, if j is different from palette_size, step 1207 is performed where the absolute value for each colour component between $p_i$ and the palette element at the index j is computed. The formulas are shown in the Figure. If all the absolute differences are strictly less than the predefined threshold TH, the occurrence counter regarding the element "j" in the palette is incremented by one at step 1212. Step 1207 creates a class for each element of the palette under construction, such a class encompassing colours neighbouring the colour of the element, given the margin TH. Thus step 1212 counts the occurrences of each class. Step 1212 is followed by step 1213 already described.

In the condition of step 1207 is not met, the variable j is incremented by one at step 1208 to consider the next palette element in the palette. This is to compare the other palette colour elements to the current pixel through new occurrence of step 1207. If no element in the palette meets the criterion of step 1207, a new element is added to the palette as described above with reference to steps 1209, 1210 and 1211.

One may note that the decision module 1207 can compared each color element for a 4:4:4 (YUV or RGB) sequences and can only compare the Luma colour component for 4:2:0 sequences.

At the end of the process of FIG. 12, the table "Counter" contains the number of occurrences of the classes defined by the respective palette elements. Then the palette elements are ordered at step 1215 according to their occurrences so that the most frequent element is in the first position (entry with the lowest index or "level") in the palette.

One may also note that the size of the palette can be limited to a maximum size, for example 24 entries. In such a case, if the size of the palette resulting from step 1215 exceeds 24, the palette is reduced by removing the elements (entries) from the $25^{th}$ position in the ordered palette. It results that a palette has been built.

Turning now to the selection of the Pred mode, Level and Run syntax elements at the encoder, input data of the process of FIG. 13 are the original coding unit of pixels, the palette as built through the process of FIG. 12 and the coding unit size. In particular, this evaluation is performed when determining which coding mode between INTRA coding, INTER coding and Palette coding has to be used.

At a first step 1301, the variable "i" representing a pixel counter is set to 0. The process described below seeks to determine the syntax elements for the pixels starting from i. The two modes of prediction are evaluated independently: "Pred mode"=0 on the right hand part of the Figure, and "Pred mode"=1 on the left hand part of the Figure.

For the 'copy up' prediction (corresponding to "Pred mode"=1), the variable "$i_{copy}$" used to count the number of levels in the current Run is set equal to 0 at step 1303. Then at step 1304, the current level at pixel location i: Block[i+$i_{copy}$], is compared to the level of the pixel located just above in the above line: Block[i+$i_{copy}$−width], where "width" corresponds to the width of the current coding unit. Note that the level Block[i+$i_{copy}$] of each pixel of the coding unit is determined in parallel at step 1308. This step consists in associating with the pixel at the position i, the closest palette element (in practice its index or level) as already explained above. This step uses the position i, the palette 1306 and the original coding unit 1307.

If Block[i+$i_{copy}$]=Block[i+$i_{copy}$−width] at step 1304, the variable "$i_{copy}$" is incremented by one at step 1305 to consider the next pixel value of the block of pixels and to indicate that the current pixel level at position i+$i_{copy}$ can be included in the current "copy up" Run. If Block[i+$i_{copy}$] is different from Block[i+$i_{copy}$−width] at step 1304 meaning that the current evaluation of a "copy up" Run has ended, the variable "$i_{copy}$" is transmitted to the decision module 1314. At this stage of the process, the variable "$i_{copy}$" corresponds to the number of values copied from the line just above.

For the left value prediction (corresponding to "Pred mode"=0), the loop to determine the Run value ($i_{left}$) is processed in parallel or sequentially. First the variable "$i_{Start}$" used to store the index i of the current pixel is set to "i", and the variable "j" used to consider successively the pixel levels following index "i" is also set equal to "i" and the variable "$i_{left}$" used to count the current Run under construction is set equal to 0. This is step 1309. Next, step 1310 consists to determine whether or not j!=0 and "Pred_mode[j−1]"=0 and Block[j]=Block[j−1]. Pred_mode[ ] is a table used by the encoder to store the prediction mode (either 1 or 0 for respectively the "copy up" prediction and the left value prediction). It is filled up progressively at step 1317 described below as the successive pixels are processed, and has been initialized with zero values for example at step 1301: Pred_mode[k]=0 for any k.

If the condition at step 1310 is met, the variable "$i_{left}$" is incremented by one at step 1311 to indicate that the current pixel level at position j can be included in the current "left value" Run, and the variable j is incremented by one at step 1312 to consider the next pixel value of the block of pixels.

If the condition at step 1310 is not met, the variable "j" is compared to "$i_{Start}$" to determine if it is the first pixel value to be examined for the current "left value" Run. This is step 1313. If "j" is equal to or less than "$i_{Start}$", meaning that it is the first pixel value to be examined for the current Run, then it starts the current Run and the next pixel value is considered at step 1312 described above. If "j" is strictly higher than "$i_{Start}$", meaning that a first pixel value different from the pixel value of the current "left value" Run has been detected. The variable "$i_{left}$" which corresponds to the length of the current "left value" Run is transmitted to the decision module 1314. Note that, as the loop for "copy up" prediction, the level Block[i] at the index i is determined in the same loop at step 1308.

After having computed the maximum run for the 'left value prediction' and the 'copy up' mode, the variable "$i_{left}$" and "$i_{copy}$" are compared at step 1314. This is to determine whether or not "$i_{copy}$"!=0 and "$i_{copy}$"+2 is higher than "$i_{left}$". This is an exemplary criterion to select either the copy up mode or the left value prediction mode. In particular, the parameter "2" may be slightly changed.

The condition at step 1314 means that if "$i_{copy}$" is equal to 0 or is smaller than or equal to $i_{left}$-2, the "left value prediction" mode is selected at step 1315. In that case, a "PredMode" variable is set equal to 0 and a Run variable is set equal to "$i_{left}$" at same step 1315. On the other hand, if "$i_{copy}$" is different from 0 and is strictly higher than "$i_{left}$-2", the "copy-up" mode is selected at step 1316. In that case, the "PredMode" variable is set equal to 1 and the Run variable to "$i_{copy}$-1" at step 1316.

Then the tables containing the "Pred_mode" and the "Run" at the encoder are updated with the current value "Pred_mode" and "Run", at step 1317. Then, the next position to consider in the block of pixels is computed at step 1318, which corresponds to the current position i incremented by the "run" value +1. Then a check is performed at step 1319 to determine whether the last pixels of the coding unit have been processed. If it is the case, the process ends at step 1320, otherwise the evaluation of the two prediction modes "left prediction" and "copy up" are evaluated starting at steps 1303 and 1309 for the next pixel position to obtain a new set of syntax elements.

At the end of this process, the encoder knows the levels for each sample of the coding unit, and is able to encode the corresponding syntax of the block of levels based on the content of the three tables Pred_mode[ ], Block[ ] and Run[ ].

Generally speaking, a small value of the Golomb order is best suited for encoding of a small range of values while a higher Golomb order is best suited for encoding a higher range of values. As already explained, the Run syntax element is typically encoded using a Golomb order having a fixed value of 3. According to one aspect of the invention, the Golomb order used for the encoding of a Run value is adapted based on some parameters. These parameters may include inter alia the value of the level, the size of the palette, the prediction mode, the size of the coding unit. This is due to the fact that the expected range of the Run value may be related to these parameters in some way.

FIG. 14 illustrates the dependencies between the selection of Golomb Order for Run syntax element and other parameters. This figure is based on FIG. 10 already described. Compared to FIG. 10, FIG. 14 contains one additional module 1418 related to the determination of the Golomb Order for the decoding of the run. As described in the following embodiments, this Order parameter may depend on the palette size, the Pred mode, the value of the Level and the coding unit size 1419.

In one embodiment of the invention, the Order is updated according to the "Pred mode". It means that based on the current implementation with 2 prediction modes, 2 parameter Orders can be considered Order[0] for the "left prediction" mode corresponding to "Pred mode"=0 and Order[1] for the "copy up" prediction mode corresponding to "Pred mode"=1. Yet, one or several prediction modes may be added to the 2 considered. So, N different Orders may be considered corresponding to the N possible prediction modes.

In a specific embodiment, when N>2, only one Order can be associated with 2 or more prediction modes. In other word, several prediction modes may be mapped to a same Order value. The adaption of the Run coding according to the prediction mode is efficient because the Run value associated to each of them is generally different. Indeed, the Run value for the "copy up" mode is generally high and higher than the Run value for the "left prediction" mode as it is illustrated in the example of FIG. 9. This is also due to the nature of the "left prediction" mode which is the only mode able to transmit a level. In a preferred embodiment, the Order of the "copy up" "Pred mode" is superior to the Order of the "left prediction" mode.

In one embodiment of the invention, the Order is updated according to the level. For the "left prediction" mode ("Pred mode"=0), the last decoded syntax element is a level. For this prediction mode, the level is used to set a specific Order related to the level. So the number of Orders that can be considered is equal to the palette size. In a specific embodiment, when the palette size is strictly greater than 2, only one Order can be associated with 2 or more level values. In other words, several levels may be mapped to a same Order value.

For the "copy up" prediction mode, no level is encoded, yet it can be considered that the first level copied is used to set the related Order. In an additional embodiment, the left level, as used for the "left prediction" mode, can be considered to adapt Order. The adaptation of Order according to the level is especially efficient when the palette has been ordered according to the occurrence of the levels. The lower the level is, the higher its occurrence. So, the expected Run value for the lower level should be higher than for the highest level value. In a preferred embodiment the Order defined for the lower level is greater than the Order defined for the highest level.

In one embodiment of the invention, Order is determined based on the palette size. As described in the foregoing, the maximum palette size is set by default. So the number of Orders that can be considered is equal to the palette size. Yet, this is not needed, and advantageously a smaller range of Order values can be considered in a preferred embodiment. The adaptation of Order according to the palette size is efficient because when the number of levels is low the average Run value increases. In the same way, if the number of levels is higher the average Run value decreases. So, it is useful to increase the Order when the palette size is low and to decrease the Order when the palette size is high. In a preferred embodiment, the Order of the lower palette size value is superior to the Order of the highest palette size value. In a specific embodiment, the Order can be determined by a formula depending on the palette size.

In one embodiment of the invention, the Order is determined based on the coding unit size. So the number of Order values that can be considered is equal to 4 if we consider the current coding unit sizes: 64×64, 32×32, 16×16, 8×8. Yet, this is not needed, and smaller number of Order values can be considered in another embodiment. The adaptation of the Order according to the coding unit size is efficient because when the coding unit size is low the expected Run value should be lower; in the same way if the coding unit size is high the expected Run value should be larger. So, it is useful to decrease the Order when the coding unit size is low and to increase the Order when the coding unit size is high. In a preferred embodiment, the Order value determined for the lower coding unit size is lower than the Order value determined for the highest coding unit size value. In a specific embodiment, the Order value can be obtained by a formula depending on the palette size.

In one embodiment, the Order value depends on the number of pixels remaining in the block of level to be decoded or encoded. In FIG. 14, it means that the Order value depends on the value Pixels_in_Block-j. Indeed, lower is the number of pixels not yet decoded or encoded, lower is the expected value of the Run element.

In one embodiment, the different proposed adaptations method may be combined.

In one embodiment, the Order value is determined based on the palette size and on the coding unit size for example according to the following table:

|  |  | Cu sizes | | | |
|---|---|---|---|---|---|
|  |  | 8 × 8 | 16 × 16 | 32 × 32 | 64 × 64 |
| Palette | [1 ... 3] | 0 | 0 | 2 | 3 |
| size | [4 ... 12] | 0 | 1 | 1 | 3 |
|  | [13 ... 24] | 0 | 1 | 1 | 2 |

Please note that this table is only given as a possible example.

In one embodiment, the Order value is determined based on the prediction mode "Pred mode" and on the Level value. In a preferred embodiment, the Order value is given by the following formula:

If(pred_mode==1)Order=Order0 else if(pred_mode==0 AND level==0)Order=Order1 else Order=Order2

In a preferred embodiment, Order0=Order1. Indeed, the level equals to 0 is the background of the block of levels. So the expected Run value following the level equal to 0 should be higher than for the other level values. In a preferred embodiment, Order0=Order1=2 and Order2=0. It means that the expected Run value should be high for "copy up" prediction mode and for the "left prediction" mode when the level 0 (block background) and lower for other levels values for the "left prediction" mode.

In one embodiment, a category is defined based on some parameters. For example, a category may be defined based on the prediction mode or based on the prediction mode and the level as described above. An Order value is associated with each category and called OrderN where N is the number of the category. Then the order value determined for each category may be adapted based on some other parameters. For example, it may be adapted based on the last Order value determined for this category and on the last Run value decoded. For each category, the Order value is initialized. It may be initialized to default values or to the value 0. Or, it may be initialized using the last Order value as defined for a previous coding unit.

In one embodiment, after decoding a Run value using a given Order value, the encoder and the decoder compute the OptOrder which is the Golomb Order value that would have been optimal for the encoding of the decoded Run value. This optimal Order value is then used as the determined Order value for the next decoded run.

One alternative is that the Order value is initialized with value 3. For the first run of each category, the Order value depends on the other order values previously decoded.

For example, the following formula may be used:

If(LastRunN=0)OrderN=Max(0,LastOrderN−1)

If(LastRunN>3*(LastOrderN+1))OrderN=Min(4,LastOrderN+1)

Where LastOrderN is the last used OrderN. The LastRunN is the last decoded Run value for category N.

In another embodiment, each category has its own formula to update OrderN value. For example, the formula of Order2 should decrease the Order value faster than for the two other Order0 and Order1 with the following formula:

If(LastRun2<=2)Order2=Max(0,LastOrder2−1)

Instead of

If(LastRun2=0)Order2=Max(0,LastOrder2−1)

In one embodiment, the Order value is transmitted in the bitstream. FIG. 15 illustrates this embodiment for the current coding unit. So, the Order value is extracted from the bitstream 1501 for the decoding of the run parameters in a step 1518. FIG. 15 is based on FIG. 10. So other modules are the same as those used in FIG. 10. At encoder side, this parameter is selected with a Rate Distortion criterion. This algorithm consists in testing several values of the Order. The value which gives the best Rate Distortion compromise is selected.

To limit the impact on the bitrate, this value can be restricted to a small fixed number of values. For example, Order values may be limited to only 3 values: 0, 1, 2. So, this value can be coded with a code of 1 or 2 bits (according to the value). One flag can be transmitted to know if it is needed to change or not the Order values. In another embodiment, this Order value can be predicted by another Order value or the last Order value used. In another embodiment, one bit can be signaled to signal that Order=0 or that Order=2.

This embodiment can be combined with those already described. In a preferred embodiment, 3 Order values are considered, Order0, Order1, Order2 as described in the previous section. So, Order0 is used for "Pred mode" "copy up" (=1), Order1 is used for "Pred mode" left (=0) when the level previously decoded is 0, otherwise Order2 is used. And these OrderN are transmitted for each coding unit. In preferred embodiment, only Order0 and Order2 are transmitted and Order1=Order0. These embodiments are represented in FIG. 15; Indeed, the module 1518 has some relations with block the "Pred mode" 1510, the level 1512.

In one embodiment some Run values are not transmitted, meaning that they are replaced by a default value, for example the value 0. Typically, the Run values not transmitted are the one associated to the higher Level values which are the less common. It means that repetition pattern of the less common Level values will not be used for the encoding. Two successive pixels in the block of levels having the same high Level values will generate each a coding as if there was no repetition. The decision not to transmit a given Run value may be based on the last decoded Level value. For example, a threshold may be defined on the Level value. This threshold may be fixed, for example having a value of 4. The threshold may be based on a look up table based on the coding unit size and on the palette size.

In one embodiment, the threshold is transmitted in the bitstream at sequence, frame, CTB or coding unit level.

FIG. 16 illustrates the embodiment related to the decoding of the threshold called the "limit" in this figure.

In one embodiment, the limit is coded with a unary max code or with a unary code. If this limit is coded for each coding unit, the maximum size of the unary max code is equal to the palette size. A binary code can be also considered and at coding unit level and the number of bits may depend on the palette size. FIG. 16 illustrates these embodiments. The limit is decoded from the bitstream 1618. Then, as for the palette size, the limit is set equal to the decoded limit+1 1619. When the "Level" is decoded 1612 and if it is greater than or equal to the limit 1620 the run syntax element is not decoded and it is set equal to 0. And the module 1615 is processed otherwise the run is decoded 1614 as usual. Please note that the limit is decoded once for each coding unit.

In another embodiment, the limit is coded before the palette size with a unary code. The palette size is set equal to decoded size+limit+1.

At encoder side, this limit is selected based on a rate distortion criterion. It means that several tests are computed in order to find the best limit in term of rate distortion criterion. Another solution, at encoder side is to select the limit equal to the lower level for which all run parameters are equal to 0. It means that for all levels superior to this limit, the associated run is set equal to 0.

In one embodiment, the Golomb Order is always set equal to 0 (Golomb_H(0)), whatever the value of other parameters.

In one embodiment, the value of the Run value is limited in order to avoid too large Golomb code. Indeed, when a value is really large, the Golomb code associated has a very large number of bits. This increases significantly the entropy decoding complexity process and increases consequently the complexity of the worst case. The worst case is used to design hardware. An alternative to this embodiment is to associate a limit value to the Golomb code, and if this limit value is decoded, the decoder read and additional binary code. It means that if the current value is strictly inferior to the limit; the current value is coded usually with the Golomb code. And if this current value is superior or equal to the limit, the limit is coded with the Golomb code following by a fixed number of bits. The fixed number of bits is a binary code. In that case, the current value is equal to limit plus the number associated to the additional fixed bits.

All described embodiments can be combined.

In a preferred embodiment three categories are defined based on the prediction mode and the last decoded level according to the following formula:

If(pred_mode==1)Order=Order0 else if(pred_mode==0 AND level==0)Order=Order1 else Order=Order2

The three corresponding Order values, Order0, Order1 and Order2 are initialized as follow: Order0=Order1=2 and Order2=0. Then the three order values are updated according to the following formula:

If(LastRun$N$=0)Order$N$=Max(0,LastOrder$N$−1)

If(LastRun$N$>3*(LastOrder$N$+1))Order$N$=Min(4,LastOrder$N$+1)

Where LastOrderN is the last used OrderN. The LastRunN is the last decoded Run value for category N.

In addition, for the Pred Mode=0, the Run values are not coded and decoded when the last decoded Level value is strictly greater than (or greater than or equal) to a threshold. The threshold is extracted from the bitstream for each Palette mode coding unit.

While being described in relation with the Golomb code, the same could apply to adapt the length of any other entropic code. For example, using an Huffman code, a particular dictionary of Huffman code may be determined according to the coding parameters.

FIG. 17 is a schematic block diagram of a computing device 1700 for implementation of one or more embodiments of the invention. The computing device 1700 may be a device such as a micro-computer, a workstation or a light portable device. The computing device 1700 comprises a communication bus connected to:
- a central processing unit 1701, such as a microprocessor, denoted CPU;
- a random access memory 1702, denoted RAM, for storing the executable code of the method of embodiments of the invention as well as the registers adapted to record variables and parameters necessary for implementing the method for encoding or decoding at least part of an image according to embodiments of the invention, the memory capacity thereof can be expanded by an optional RAM connected to an expansion port for example;
- a read only memory 1703, denoted ROM, for storing computer programs for implementing embodiments of the invention;
- a network interface 1704 is typically connected to a communication network over which digital data to be processed are transmitted or received. The network interface 1704 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 1701;
- a user interface 1705 may be used for receiving inputs from a user or to display information to a user;
- a hard disk 1706 denoted HD may be provided as a mass storage device;
- an I/O module 1707 may be used for receiving/sending data from/to external devices such as a video source or display.

The executable code may be stored either in read only memory 1703, on the hard disk 1706 or on a removable digital medium such as for example a disk. According to a variant, the executable code of the programs can be received by means of a communication network, via the network interface 1704, in order to be stored in one of the storage means of the communication device 1700, such as the hard disk 1706, before being executed.

The central processing unit 1701 is adapted to control and direct the execution of the instructions or portions of software code of the program or programs according to embodiments of the invention, which instructions are stored in one of the aforementioned storage means. After powering on, the CPU 1701 is capable of executing instructions from main RAM memory 1702 relating to a software application after those instructions have been loaded from the program ROM 1703 or the hard-disc (HD) 1706 for example. Such a software application, when executed by the CPU 1701, causes the steps of the flowcharts shown in FIGS. 10 to 16 to be performed.

Any step of the algorithm shown in FIGS. 10 to 16 may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of encoding a digital image of a sequence of digital images, the method comprising the steps of:
   encoding samples of the image in a Palette mode, the Palette mode having a Run syntax element which is encoded using entropy encoding,
   using an entropy-code control parameter to control the entropy-encoding of said Run syntax element, and
   determining said entropy-code control parameter in dependence upon a flag syntax element of said Palette mode indicating whether or not a palette index of a current sample is equal to a palette index of a sample at the same position in the row above the current sample.

2. A method of decoding a digital image of a sequence of digital images, the method comprising the steps of:
   decoding samples of the image encoded in a Palette mode, the Palette mode having a Run syntax element which is encoded using entropy encoding,
   using an entropy-code control parameter to control the entropy-decoding of said Run syntax element, and
   determining said entropy-code control parameter in dependence upon a flag syntax element of said Palette mode indicating whether or not a palette index of a current sample is equal to a palette index of a sample at the same position in the row above the current sample.

3. A device for encoding a digital image of a sequence of digital images, the device comprising:
   an encoding unit which encodes samples of the image in a Palette mode, the Palette mode having a Run syntax element which is encoded using entropy encoding,
   a control unit which uses an entropy-code control parameter to control the entropy-encoding of said Run syntax element, and
   a determining unit which determines said entropy-code control parameter in dependence upon a flag syntax element of said Palette mode indicating whether or not a palette index of a current sample is equal to a palette index of a sample at the same position in the row above the current sample.

4. A device for decoding a digital image of a sequence of digital images, the device comprising:
   a decoding unit which decodes samples of the image encoded in a Palette mode, the Palette mode having a Run syntax element which is encoded using entropy encoding,
   a control unit which uses an entropy-code control parameter to control the entropy-decoding of said Run syntax element, and
   a determining unit which determines said entropy-code control parameter in dependence upon a flag syntax element of said Palette mode indicating whether or not a palette index of a current sample is equal to a palette index of a sample at the same position in the row above the current sample.

5. A non-transitory computer-readable storage medium storing instructions of a computer program for implementing a method of encoding a digital image of a sequence of digital images, the program comprising:
   a code portion which encodes samples of the image in a Palette mode, the Palette mode having a Run syntax element which is encoded using entropy encoding,
   a code portion which uses an entropy-code control parameter to control the entropy-encoding of said Run syntax element, and
   a code portion which determines said entropy-code control parameter in dependence upon a flag syntax element of said Palette mode indicating whether or not a palette index of a current sample is equal to a palette index of a sample at the same position in the row above the current sample.

6. A non-transitory computer-readable storage medium storing instructions of a computer program for implementing a method of decoding a digital image of a sequence of digital images, the program comprising:
   a code portion which decodes samples of the image encoded in a Palette mode, the Palette mode having a Run syntax element which is encoded using entropy encoding,
   a code portion which uses an entropy-code control parameter to control the entropy-decoding of said Run syntax element, and
   a code portion which determines said entropy-code control parameter in dependence upon a flag syntax element of said Palette mode indicating whether or not a palette index of a current sample is equal to a palette index of a sample at the same position in the row above the current sample.

* * * * *